(12) United States Patent
McGeoch et al.

(10) Patent No.: US 11,900,264 B2
(45) Date of Patent: Feb. 13, 2024

(54) SYSTEMS AND METHODS FOR HYBRID QUANTUM-CLASSICAL COMPUTING

(71) Applicant: D-WAVE SYSTEMS INC., Burnaby (CA)

(72) Inventors: Catherine McGeoch, Amherst, MA (US); William W. Bernoudy, Vancouver (CA)

(73) Assignee: D-WAVE SYSTEMS INC., Burnaby (CA)

( * ) Notice: Subject to any disclaimer, the term of this patent is extended or adjusted under 35 U.S.C. 154(b) by 541 days.

(21) Appl. No.: 16/785,125

(22) Filed: Feb. 7, 2020

(65) Prior Publication Data

US 2020/0257987 A1    Aug. 13, 2020

Related U.S. Application Data

(60) Provisional application No. 62/802,809, filed on Feb. 8, 2019.

(51) Int. Cl.
*G06N 5/01* (2023.01)
*G06F 15/163* (2006.01)
(Continued)

(52) U.S. Cl.
CPC .......... *G06N 5/01* (2023.01); *G06F 15/163* (2013.01); *G06F 17/18* (2013.01); *G06N 10/00* (2019.01)

(58) Field of Classification Search
CPC ....... G06F 15/163; G06F 17/18; G06N 10/00; G06N 5/003; G06N 20/20; G06N 5/01
See application file for complete search history.

(56) References Cited

U.S. PATENT DOCUMENTS

| 5,249,122 A | 9/1993 | Stritzke |
| 6,424,933 B1 | 7/2002 | Agrawala et al. |

(Continued)

FOREIGN PATENT DOCUMENTS

| CN | 101473346 A | 7/2009 |
| CN | 101657827 A | 2/2010 |

(Continued)

OTHER PUBLICATIONS

Blume-Kohout et al.; "Streaming Universal Distortion-Free Entanglement Concentration"; IEEE Transactions on Information Theory Year: 2014 | vol. 60, Issue: 1 | Journal Article | Publisher: IEEE; Cited by: Papers (4) (Year: 2014).*

(Continued)

*Primary Examiner* — Jack Chiang
*Assistant Examiner* — Aric Lin
(74) *Attorney, Agent, or Firm* — Cozen O'Connor

(57) ABSTRACT

Hybrid quantum-classical approaches for solving computational problems in which results from a quantum processor are combined with an exact method executed on a classical processor are described. Quantum processors can generate candidate solutions to a combinatorial optimization problem, but since quantum processors can be probabilistic, they are unable to certify that a solution is an optimal solution. A hybrid quantum-classical exact solver addresses this problem by combining outputs from a quantum annealing processor with a classical exact algorithm that is modified to exploit properties of the quantum computation. The exact method executed on a classical processor can be a Branch and Bound algorithm. A Branch and Bound algorithm can be modified to exploit properties of quantum computation including a) the sampling of multiple low-energy solutions by a quantum processor, and b) the embedding of solutions (Continued)

in a regular structure such as a native hardware graph of a quantum processor.

14 Claims, 4 Drawing Sheets

(51) Int. Cl.
  *G06F 17/18* (2006.01)
  *G06N 10/00* (2022.01)

(56) References Cited

U.S. PATENT DOCUMENTS

| | | | |
|---|---|---|---|
| 6,671,661 B1 | 12/2003 | Bishop | |
| 7,135,701 B2 | 11/2006 | Amin et al. | |
| 7,253,654 B2 | 8/2007 | Amin | |
| 7,418,283 B2 | 8/2008 | Amin | |
| 7,493,252 B1 | 2/2009 | Nagano et al. | |
| 7,533,068 B2 | 5/2009 | Maassen et al. | |
| 7,624,088 B2 | 11/2009 | Johnson et al. | |
| 7,876,248 B2 | 1/2011 | Berkley et al. | |
| 8,008,942 B2 | 8/2011 | Van et al. | |
| 8,035,540 B2 | 10/2011 | Berkley et al. | |
| 8,073,808 B2 | 12/2011 | Rose | |
| 8,175,995 B2 | 5/2012 | Amin | |
| 8,190,548 B2 | 5/2012 | Choi | |
| 8,195,596 B2 | 6/2012 | Rose et al. | |
| 8,244,650 B2 | 8/2012 | Rose | |
| 8,340,439 B2 | 12/2012 | Mitarai et al. | |
| 8,421,053 B2 | 4/2013 | Bunyk et al. | |
| 8,494,993 B2 | 7/2013 | Harris et al. | |
| 8,504,497 B2 | 8/2013 | Amin | |
| 8,548,828 B1 | 10/2013 | Longmire | |
| 8,560,282 B2* | 10/2013 | Macready | H04L 9/0852 703/3 |
| 8,854,074 B2 | 10/2014 | Berkley | |
| 8,863,044 B1 | 10/2014 | Casati et al. | |
| 9,015,215 B2 | 4/2015 | Berkley et al. | |
| 9,378,733 B1 | 6/2016 | Vanhoucke et al. | |
| 9,495,644 B2* | 11/2016 | Chudak | B82Y 10/00 |
| 9,727,824 B2* | 8/2017 | Rose | G06N 20/00 |
| 9,881,256 B2* | 1/2018 | Hamze | G06N 10/00 |
| 10,296,846 B2 | 5/2019 | Csurka et al. | |
| 10,318,881 B2 | 6/2019 | Rose et al. | |
| 10,339,466 B1 | 7/2019 | Ding et al. | |
| 10,817,796 B2 | 10/2020 | Macready et al. | |
| 11,157,817 B2 | 10/2021 | Rolfe | |
| 2002/0010691 A1 | 1/2002 | Chen | |
| 2002/0077756 A1 | 6/2002 | Arouh et al. | |
| 2002/0184166 A1 | 12/2002 | Jackson et al. | |
| 2003/0030575 A1 | 2/2003 | Frachtenberg et al. | |
| 2004/0000666 A1 | 1/2004 | Lidar et al. | |
| 2005/0119829 A1 | 6/2005 | Bishop et al. | |
| 2005/0224784 A1 | 10/2005 | Amin et al. | |
| 2006/0041421 A1 | 2/2006 | Ta et al. | |
| 2006/0047477 A1 | 3/2006 | Bachrach | |
| 2006/0074870 A1 | 4/2006 | Brill et al. | |
| 2006/0115145 A1 | 6/2006 | Bishop et al. | |
| 2006/0225165 A1 | 10/2006 | Maassen et al. | |
| 2007/0011629 A1 | 1/2007 | Shacham et al. | |
| 2007/0162406 A1 | 7/2007 | Lanckriet | |
| 2008/0069438 A1 | 3/2008 | Winn et al. | |
| 2008/0103996 A1 | 5/2008 | Forman et al. | |
| 2008/0109500 A1 | 5/2008 | Macready et al. | |
| 2008/0132281 A1 | 6/2008 | Kim et al. | |
| 2008/0176750 A1 | 7/2008 | Rose et al. | |
| 2008/0215850 A1 | 9/2008 | Berkley et al. | |
| 2008/0312663 A1 | 12/2008 | Haimerl et al. | |
| 2008/0313430 A1 | 12/2008 | Bunyk | |
| 2009/0077001 A1 | 3/2009 | Macready et al. | |
| 2009/0121215 A1 | 5/2009 | Choi | |
| 2009/0167342 A1 | 7/2009 | Van et al. | |
| 2009/0171956 A1 | 7/2009 | Gupta et al. | |
| 2009/0254505 A1 | 10/2009 | Davis et al. | |
| 2009/0278981 A1 | 11/2009 | Bruna et al. | |
| 2009/0299947 A1 | 12/2009 | Amin et al. | |
| 2009/0322871 A1 | 12/2009 | Ji et al. | |
| 2010/0010657 A1 | 1/2010 | Do et al. | |
| 2010/0022820 A1 | 1/2010 | Leuthardt et al. | |
| 2010/0185422 A1 | 7/2010 | Hoversten | |
| 2010/0185572 A1 | 7/2010 | Bonabeau et al. | |
| 2010/0228694 A1 | 9/2010 | Le et al. | |
| 2010/0306142 A1 | 12/2010 | Amin | |
| 2010/0332423 A1 | 12/2010 | Kapoor et al. | |
| 2011/0022369 A1 | 1/2011 | Carroll et al. | |
| 2011/0022820 A1 | 1/2011 | Bunyk et al. | |
| 2011/0031994 A1 | 2/2011 | Berkley | |
| 2011/0044524 A1 | 2/2011 | Wang et al. | |
| 2011/0047201 A1 | 2/2011 | Macready et al. | |
| 2011/0060710 A1 | 3/2011 | Amin | |
| 2011/0142335 A1 | 6/2011 | Ghanem et al. | |
| 2011/0231462 A1 | 9/2011 | Macready et al. | |
| 2011/0238378 A1 | 9/2011 | Allen et al. | |
| 2011/0295845 A1 | 12/2011 | Gao et al. | |
| 2012/0084235 A1 | 4/2012 | Suzuki et al. | |
| 2012/0124432 A1 | 5/2012 | Pesetski et al. | |
| 2012/0149581 A1 | 6/2012 | Fang | |
| 2012/0215821 A1 | 8/2012 | Macready et al. | |
| 2012/0254586 A1 | 10/2012 | Amin et al. | |
| 2013/0071837 A1 | 3/2013 | Winters-Hilt et al. | |
| 2013/0097103 A1 | 4/2013 | Chari et al. | |
| 2013/0218974 A1 | 8/2013 | Cao et al. | |
| 2013/0236090 A1 | 9/2013 | Porikli et al. | |
| 2013/0245429 A1 | 9/2013 | Zhang et al. | |
| 2013/0275351 A1 | 10/2013 | Cantin | |
| 2013/0278283 A1 | 10/2013 | Berkley | |
| 2013/0282636 A1 | 10/2013 | Macready et al. | |
| 2014/0025606 A1 | 1/2014 | Macready | |
| 2014/0040176 A1 | 2/2014 | Balakrishnan et al. | |
| 2014/0152849 A1 | 6/2014 | Bala et al. | |
| 2014/0187427 A1 | 7/2014 | Macready et al. | |
| 2014/0200824 A1 | 7/2014 | Pancoska | |
| 2014/0201208 A1 | 7/2014 | Satish et al. | |
| 2014/0214835 A1 | 7/2014 | Oehrle et al. | |
| 2014/0214836 A1 | 7/2014 | Stivoric et al. | |
| 2014/0223224 A1 | 8/2014 | Berkley | |
| 2014/0250288 A1 | 9/2014 | Roy | |
| 2014/0279727 A1 | 9/2014 | Baraniuk et al. | |
| 2014/0297235 A1 | 10/2014 | Arora et al. | |
| 2014/0324933 A1 | 10/2014 | Macready et al. | |
| 2014/0337612 A1 | 11/2014 | Williams | |
| 2014/0344322 A1 | 11/2014 | Ranjbar | |
| 2015/0006443 A1 | 1/2015 | Rose et al. | |
| 2015/0032993 A1 | 1/2015 | Amin et al. | |
| 2015/0032994 A1 | 1/2015 | Chudak et al. | |
| 2015/0161524 A1 | 6/2015 | Hamze | |
| 2015/0193692 A1 | 7/2015 | Israel | |
| 2015/0205759 A1 | 7/2015 | Israel et al. | |
| 2015/0242463 A1 | 8/2015 | Lin et al. | |
| 2015/0248586 A1 | 9/2015 | Gaidon et al. | |
| 2015/0269124 A1 | 9/2015 | Hamze et al. | |
| 2015/0310350 A1 | 10/2015 | Niskanen et al. | |
| 2015/0317558 A1 | 11/2015 | Adachi et al. | |
| 2015/0363708 A1 | 12/2015 | Amin et al. | |
| 2016/0019459 A1 | 1/2016 | Audhkhasi et al. | |
| 2016/0042294 A1* | 2/2016 | Macready | G06N 5/02 706/10 |
| 2016/0071021 A1 | 3/2016 | Raymond | |
| 2016/0078359 A1 | 3/2016 | Csurka et al. | |
| 2016/0078600 A1 | 3/2016 | Perez Pellitero et al. | |
| 2016/0085616 A1 | 3/2016 | Berkley | |
| 2016/0110657 A1 | 4/2016 | Gibiansky et al. | |
| 2016/0132785 A1 | 5/2016 | Amin et al. | |
| 2016/0174902 A1 | 6/2016 | Georgescu et al. | |
| 2016/0180746 A1 | 6/2016 | Coombes et al. | |
| 2016/0191627 A1 | 6/2016 | Huang et al. | |
| 2016/0217594 A1 | 7/2016 | Petschke et al. | |
| 2016/0253597 A1 | 9/2016 | Bhatt et al. | |
| 2016/0307305 A1 | 10/2016 | Madabhushi et al. | |
| 2016/0321559 A1 | 11/2016 | Rose et al. | |
| 2016/0328253 A1* | 11/2016 | Majumdar | G06N 10/00 |
| 2017/0132509 A1 | 5/2017 | Li et al. | |
| 2017/0147944 A1 | 5/2017 | Csurka et al. | |
| 2017/0161612 A1 | 6/2017 | Hastings et al. | |

(56) References Cited

U.S. PATENT DOCUMENTS

| | | | |
|---|---|---|---|
| 2017/0161633 | A1 | 6/2017 | Clinchant et al. |
| 2017/0177534 | A1 | 6/2017 | Mohseni et al. |
| 2017/0255629 | A1 | 9/2017 | Thom et al. |
| 2017/0255871 | A1 | 9/2017 | Macready et al. |
| 2017/0264373 | A1 | 9/2017 | Krovi et al. |
| 2017/0300817 | A1 | 10/2017 | King et al. |
| 2018/0018584 | A1 | 1/2018 | Nock et al. |
| 2018/0025291 | A1 | 1/2018 | Dey et al. |
| 2018/0082172 | A1 | 3/2018 | Patel et al. |
| 2018/0101784 | A1 | 4/2018 | Rolfe et al. |
| 2018/0137422 | A1 | 5/2018 | Wiebe et al. |
| 2018/0150728 | A1 | 5/2018 | Vahdat |
| 2018/0157923 | A1 | 6/2018 | El Kaliouby et al. |
| 2018/0165554 | A1 | 6/2018 | Zhang et al. |
| 2018/0165601 | A1 | 6/2018 | Wiebe et al. |
| 2018/0196780 | A1 | 7/2018 | Amin et al. |
| 2018/0246848 | A1 | 8/2018 | Douglass et al. |
| 2018/0276556 | A1 | 9/2018 | Garrison et al. |
| 2018/0277246 | A1 | 9/2018 | Zhong et al. |
| 2019/0005402 | A1 | 1/2019 | Mohseni et al. |
| 2019/0018933 | A1 | 1/2019 | Oono et al. |
| 2019/0019099 | A1 | 1/2019 | Hoskinson et al. |
| 2019/0030078 | A1 | 1/2019 | Aliper et al. |
| 2019/0050534 | A1 | 2/2019 | Apte et al. |
| 2019/0080255 | A1 | 3/2019 | Allen et al. |
| 2019/0108912 | A1 | 4/2019 | Spurlock et al. |
| 2019/0122404 | A1 | 4/2019 | Freeman et al. |
| 2019/0180147 | A1 | 6/2019 | Zhang et al. |
| 2019/0258907 | A1 | 8/2019 | Rezende et al. |
| 2019/0258952 | A1* | 8/2019 | Denchev ............... G06Q 10/00 |
| 2019/0266510 | A1 | 8/2019 | Yarkoni et al. |
| 2020/0167691 | A1 | 5/2020 | Golovin et al. |
| 2020/0226197 | A1* | 7/2020 | Woerner ............... G06N 10/00 |
| 2020/0234172 | A1* | 7/2020 | King ...................... G06N 5/003 |
| 2020/0311589 | A1* | 10/2020 | Ollitrault ............... G16C 10/00 |
| 2020/0410384 | A1 | 12/2020 | Aspuru-Guzik et al. |
| 2021/0279631 | A1* | 9/2021 | Pichler .................. G06N 10/00 |
| 2022/0101170 | A1* | 3/2022 | Denchev ............... G06N 10/00 |

FOREIGN PATENT DOCUMENTS

| | | | |
|---|---|---|---|
| CN | 102364497 A | | 2/2012 |
| CN | 102651073 A | | 8/2012 |
| CN | 102831402 A | | 12/2012 |
| CN | 102324047 B | | 6/2013 |
| CN | 102364497 B | | 6/2013 |
| CN | 104050509 A | | 9/2014 |
| CN | 102037475 B | | 5/2015 |
| CN | 104766167 A | | 7/2015 |
| CN | 104919476 A | | 9/2015 |
| CN | 103249368 B | | 1/2016 |
| CN | 106569601 A | | 4/2017 |
| CN | 112771549 A | * 5/2021 | ............... G06F 17/11 |
| JP | 2011008631 A | | 1/2011 |
| KR | 20130010181 A | | 1/2013 |
| WO | 2005093649 A1 | | 10/2005 |
| WO | 2009120638 A2 | | 10/2009 |
| WO | 2010071997 A1 | | 7/2010 |
| WO | 2015103375 A1 | | 7/2015 |
| WO | 2015193531 A1 | | 12/2015 |
| WO | 2016029172 A1 | | 2/2016 |
| WO | 2016037300 A1 | | 3/2016 |
| WO | 2016089711 A1 | | 6/2016 |
| WO | 2016183213 A1 | | 11/2016 |
| WO | 2016210018 A1 | | 12/2016 |
| WO | 2017031356 A1 | | 2/2017 |
| WO | 2017031357 A1 | | 2/2017 |
| WO | 2017066695 A1 | | 4/2017 |
| WO | 2017075246 A1 | | 5/2017 |
| WO | 2017124299 A1 | | 7/2017 |
| WO | 2017132545 A1 | | 8/2017 |
| WO | 2019118644 A1 | | 6/2019 |
| WO | 2020163455 A1 | | 8/2020 |

OTHER PUBLICATIONS

Rezende, Danilo J, et al., "Variational Inference with Normalizing Flows", Proceedings of the 32nd International Conference on Machine Learning, Lille, France 2015, JMLR: W&CP vol. 37, 9 pages.

Rolfe , "Discrete variational autoencoders" arXiv:1609.02200 Apr. 22, 2017. https://arxiv.org/abs/1609.02200.

Rose , et al., "Systems and Methods for Quantum Processing of Data, for Example Functional Magnetic Resonance Image Data". U.S. Appl. No. 61/841,129, filed Jun. 28, 2013, 129 pages.

Rose , et al., "Systems and Methods for Quantum Processing of Data, for Example Imaging Data". U.S. Appl. No. 61/873,303, filed Sep. 3, 2013, 38 pages.

Salakhutdinov, R. , "Learning deep Boltzmann machines using adaptive MCMC", 2010.

Salakhutdinov, R. , "Learning in Markov random transitions.elds using tempered", 2009.

Salakhutdinov, R. & Murray, I. , "On the quantitative analysis of deep belief networks", 2008.

Saliman, Tim , "A Structured Variational Auto-encoder for Learning Deep Hierarchies of Sparse Features", arXiv:1602.08734v1 [stat.ML] Feb. 28, 2016, 3 pages.

Salimans, Tim , et al., "Markov Chain Monte Carlo and Variational Inference: Bridging the Gap", arXiv:1410.6460v4 [stat.CO] May 19, 2015, 9 pages.

Schulman , et al., "Gradient estimation using stochastic computing graphs". arXiv:1506.05254, Jan. 5, 2016. https://arxiv.org/abs/1506.05254.

Schwartz-Ziv , et al., "Opening the black box of Deep Neural Networks via Information", arXiv:1703.00810 Apr. 29, 2017. https://arxiv.org/abs/1703.00810.

Sethi , et al., "A revived survey of various credit card fraud detecion techniques", International Journal of Computer Science and Mobile Computing Apr. 14, 2014. https://tarjomefa.com/wp-content/uploads/2018/08/TarjomeFa-F994-English.pdf.

Shahriari , et al., "Taking the human out of the loop: A review of bayesian optimization", Proceedings of the IEEE 104 Jan. 1, 2016.

Silver , et al., "Mastering the game of Go with deep neural networks and tree search". Nature, 529, 484489, 2016.

Smelyanskiy , et al., "A near-term quantum computing approach for hard computational problems in space exploration" arXiv preprint arXir:1204.2821 (year:2012).

Sonderby , et al., "Ladder Variational Autoencoders", arXiv:1602.02282v3 [stat.ML] May 27, 2016, 12 pages.

Sprechmann , et al., "Dictionary learning and sparse coding for unsupervised clustering", in 2010 IEEE international conference on acoustics, speech and signal processing (pp. 2042-2045) IEEE (year:2010).

Sutton , "Learning to Predict by the Methods of Temporal Differences". https://webdocs.cs.ualberta.ca/ sutton/papers/sutton-88-with-erratum.pdf.

Sutton, R. , et al., "Policy gradient methods for reinforcement learning with function approximation". Advances in Neural Information Processing Sytems, 12, pp. 1057-1063, MIT Press, 2000.

Suzuki , et al., "Joint Multimodal Learning With Deep Generative Models", Nov. 7, 2016, arXiv:1611.0189v1 (Year: 2016).

Szegedy , et al., "Rethinking the Inception Architecture for Computer Vision", 2016, Proceedings of the IEEE Conference on Computer Vision and Pattern Recognition (CVPR), pp. 2818-2826 (Year: 2016).

Tieleman, T. & Hinton, G. , "Using fast weights to improve persistent contrastive divergence", 2009.

Tokui , et al., "Evaluating the variance of likelihood-ratio gradient estimators", Proceedings of the 34th International Conference on Machine Learning, 2017. http://proceedings.mlr.press/v70/tokui17a.html.

Tripathi , et al., "Survey on credit card fraud detection methods", Internation Journal of Emerging Technology and Advanced Engineering Nov. 12, 2012.

Tucker , et al., "Rebar: Low-variance, unbiased gradient estimates for discrete latent variable models". arXiv:1703.07370, Nov. 6, 2017. https://arxiv.org/abs/1703.07370.

(56) References Cited

OTHER PUBLICATIONS

Vahdat, "Machine Learning Systems and Methods for Training With Noisy Labels," U.S. Appl. No. 62/427,020, filed Nov. 28, 2016, 30 pages.

Vahdat, "Machine Learning Systems and Methods for Training With Noisy Labels," U.S. Appl. No. 62/508,343, filled May 18, 2017, 46 pages.

Vahdat, "Toward Robustness against Label Noise in Training Deep Disciminative Neural Networks". arXiv:1706.00038v2, Nov. 3, 2017. https://arxiv.org/abs/1706.00038.

Vahdat, et al., "Dvae++: Discrete variational autoencoders with overlapping transformations", arXiv:1802.04920 May 25, 2018. https://arxiv.org/abs/1802.04920.

Van Det Maaten, et al., "Hidden unit conditional random Fields". 14th International Conference on Artificial Intelligence and Statistics, 2011.

Veit, et al., "Learning From Noisy Large-Scale Datasets With Minimal Supervision". arXiv:1701.01619v2, Apr. 10, 2017. https://arxiv.org/abs/1701.01619.

Wan, L., et al., "Regularization of Neural Networks using DropConnec". ICML 2013.

Wang, et al., "Classification of common human diseases derived from shared genetic and environmental determinants", Nature Genetics Aug. 7, 2017. https://www.nature.com/articles/ng.3931.

Welling, et al., "Bayesian learning via stochastic gradient langevin dynamics", ICML Jun. 28, 2011. https://dl.acm.org/doi/10.5555/3104482.3104568.

Wiebe, Nathan, et al., "Quantum Inspired Training for Boltzmann Machines", arXiv:1507.02642v1 [cs.LG] Jul. 9, 2015, 18 pages.

Williams, "Simple Statistical Gradient-Following Algorithms for Connectionist Reinforcement Learning," Springer, College of Computer Science, Northeastern University, Boston, MA, 1992, 27 pages. https://link.springer.com/article/10.1007/BF00992696.

Wittek, Peter, "What Can We Expect from Quantum Machine Learning". Yandex 1-32 School of Data Analysis Conference Machine Learning: Prospects and Applications, Oct. 5, 2015. pp. 1-16.

Xiao, et al., "Learning from massive noisy labeled data for image classification". The IEEE Conference on Computer Vision and Pattern Recognition (CVPR) 2015.

Xie, et al., "A Theory of Generative ConvNet". ICML 2016.

Xing, "Bayesian and Markov Networks: A unified view", Carnegie Mellon: School of Computer Science Sep. 19, 2007. http://www.cs.cmu.edu/~epxing/Class/10708-07/Slides/lecture3-BN&MRF.pdf.

Zhang, Yichuan, et al., "Continuous Relaxations for Discrete Hamiltonian Monte Carlo", School of Informatic, University of Edinburgh, Dept of Engineering, University of Cambridge, United Kingdom, 9 pages.

Zheng, et al., "Graph regularized sparse coding for image representation", IEEE transaction on image processing, 20(5), (Year: 2010) 1327-1336.

Awasthi et al., "Efficient Learning of Linear Seperators under Bounded Noise" Mar. 12, 2015, arXiv: 1503.03594v1, pp. 1-23. (Year: 2015).

Awasthi et al., "Learning and 1-bit Compressed Sensing under Asymmetric Noise" Jun. 6, 2016, JMLR, pp. 1-41. (Year: 2016).

Bach et al., "On the Equivalence between Herding and Conditional Gradient Algorithms," Proceedings of the 29th International Conference on Machine Learning, 2012, 8 pages.

Bach, F. et al., "Optimization with Sparsity-Inducing Penalties," arXiv:1108.0775v2 [cs.LG], Nov. 22, 2011, 116 pages.

Benedetti et al., "Quantum-assisted learning of graphical models with arbitrary pairwise connectivity" Sep. 8, 2016, arXiv: 1609.02542v1, pp. 1-13. (Year: 2016).

Blanchard et al., "Classification with Asymmetric Label Noise: Consistency and Maximal Denoising" Aug. 5, 2016, arXiv: 1303.1208v3, pp. 1-47. (Year: 2016).

Bornschein et al., "Bidirectional Helmholtz Machines" May 25, 2016, arXiv: 1506.03877v5. (Year: 2016).

Brakel, P., Dieleman, S., & Schrauwen. "Training restricted Boltzmann machines with multi-tempering: Harnessing parallelization", 2012.

Chen et al., "Herding as a Learning System with Edge-of-Chaos Dynamics," arXiv:1602.030142V2 [stat.ML], Mar. 1, 2016, 48 pages.

Chen et al., "Parametric Herding," Proceedings of the 13th International Conference on Artificial Intelligence and Statistics (AISTATS), 2010, pp. 97-104.

Chinese Office Action for Application No. CN 2016800606343, dated May 8, 2021, 21 pages (with English translation).

Courville, A. et al., "A Spike and Slab Restricted Boltzmann Machine," Proceedings of the 14th International Conference on Artificial Intelligence and Statistics (AISTATS), 2011, 9 pages.

Deng, J. et al., "ImageNet: A Large-Scale Hierarchical Image Database," Proceedings / CVPR, IEEE Computer Society Conference on Computer Vision and Pattern Recognition, 2009, 8 pages.

Desjardins, G., Courville, A., Bengio, Y., Vincent, P., & Delalleau, O. "Parallel tempering for training of restricted Boltzmann machines", 2010.

Dumoulin, V. et al., "On the Challenges of Physical Implementations of RBMs," Proceedings of the 28th AAAI Conference on Artificial Intelligence, vol. 2, Jul. 27, 2014, 7 pages.

Elkan, C., "Learning Classifiers from Only Positive and Unlabeled Data," KDD08: The 14th ACM SIGKDD International Conference on Knowledge Discovery and Data Mining Las Vegas Nevada USA Aug. 24-27, 2008, 8 pages.

Extended European Search Report for EP Application No. 16837862.8, dated Apr. 3, 2019, 12 pages.

Fergus, R. et al., "Semi-Supervised Learning in Gigantic Image Collections," Advances in Neural Information Processing Systems, vol. 22, 2009, 8 pages.

First Office Action dated Nov. 29, 2021 in CN App No. 2016800731803. (English Translation).

First Office Action issued in Chinese No. 2018101287473 with English translation, dated Jul. 12, 2021, 16 pages.

Freidman, et al., "Learning Bayesian Networks from Data", Internet Movie Database, http://www.imdb.com, 19 pages.

Freund, Y. et al., "Large Margin Classification Using the Perceptron Algorithm," Machine Learning 37(3), 1999, 19 pages.

Fung, G. et al., "Parameter Free Bursty Events Detection in Text Streams," Proceedings of the 31st VLDB Conference, Trondheim, Norway, 2005, 12 pages.

Geordie, "First Ever DBM Trained Using a Quantum Computer," URL:https://dwave.wordpress.com/2014/01/06 /first-ever-dbm-trained-using-a-quantum-computer/, Jan. 6, 2014, 8 pages.

Geordie, "Training DBMs with Physical neural nets" In Hack the Multiverse, Jan. 24, 2014, pp. 2-5.

Grassberger, "Entropy Estimates from Insufficient Samplings," arXiv:physics/0307138v2 [physics.data-an], Jan. 4, 2008, 5 pages.

Gómez-Bombarelli et al., "Automatic Chemical Design Using a Data-Driven Continuous Representation of Molecules," arXiv:1610.02415v3: Dec. 2017. (26 pages).

Goodfellow et al., "Generative Adversarial Nets", arXiv:1406.2661v1 [stat.ML], 9 pages, Jun. 10, 2014.

Husmeier, "Introduction to Learning Bayesian Networks from Data", Probabilistic Modeling in Bioinformatics and Medical Informatics 2005. https://link.springer.com/chapter/10.1007/1-84628-119-9_2.

Jang, et al., "Categorical reparameterization with Gumbel-Softmax", arXiv:1611.01144 Aug. 5, 2017. https://arxiv.org/abs/1611.01144.

Jiang, et al., "Learning a discriminative dictionary for sparse coding via label consistent K-SVD", In CVPR 2011 (pp. 1697-1704) IEEE. Jun. 2011).

Khalek, Shadi A, et al., "Automated SQL Query Generation for Systematic Testing of Database Engines", In proceedings of the IEEE/ACM International Conference of Automated Software Engineering pp. 329-332. Association of Computing Machinery. (Year: 2008).

Kingma, et al., "Adam: A method for stochastic optimization", arXiv:1412.6980 Jan. 30, 2017. https://arxiv.org/abs/1412.6980.

Kingma, et al., "Auto-encoding variational bayes". arXiv:1312.5258v1, May 1, 2014. https://arxiv.org/abs/1312.6114.

(56) References Cited

OTHER PUBLICATIONS

Kingma, Diederik P, et al., "Semi-Supervised Learning with Deep Generative Models", arXiv:1406.5298v2 [cs.LG], Oct. 31, 2014, 9 pages.

Raymond, et al., "Systems and Methods for Comparing Entropy and KL Divergence of Post-Processed Samplers," U.S. Appl. No. 62/322,116, filed Apr. 13, 2016, 47 pages.

Korenkevych, et al., "Benchmarking quantum hardware for training of fully visible boltzmann machines", arXiv:1611.04528 Nov. 14, 2016. https://arxiv.org/abs/1611.04528.

Krause, et al., "The Unreasonable Effectiveness of Noisy Data for Fine-Grained Recognition", 2016, Springer International Publishing AG, ECCV 2016, Part III, LNCS 9907, pp. 301-320 (Year:2016).

Kuzelka, Ondrej, et al., "Fast Estimation of First-Order Clause Coverage through Randomization and Maximum Likelihood", In proceeding of the 25th International Conference on Machine Learning (pp. 504-5112). Association for Computing Machinery (Year:2008).

L.Wan, M. Zieler, et. al., "Regularization of Neural Networks using DropConnect". ICML, 2013.

Le Roux, Nicolas, et al., "Representational Power of Restricted Boltzmann Machines and Deep Belief Networks", Dept. IRO, University of Montréal Canada, Technical Report 1294, Apr. 18, 2007, 14 pages.

Lee, et al., "Efficient sparse coding algorithm", NIPS, 2007,pp. 801-808.

Rezende, et al., "Stochastic Backpropagation and Approximate Inference in Deep Generative Models," arXiv:1401.4082v3 [stat.ML] May 30, 2014, 14 pages. https://arxiv.org/abs/1401.4082.

Lee, H., et al., "Sparse deep belief net model for visual area v2". Advances in Neural Information Processing Systems, 20. MIT Press, 2008.

Li, et al., "R/'enyi Divergence Variational Inference", arXiv:1602.02311 Oct. 28, 2016. https://arxiv.org/abs/1602.02311.

Lin, et al., "Efficient Piecewise Training of Deep Structured Models for Semantic Segmentation". arXiv:1504.01013v4, 2016.

Lovasz, et al., "A Correction: orthogonal representations and connectivity of graphs", Linear Algebra and it's Applications 313:2000 pp. 101-105.

Lovasz, et al., "Orthogonal Representations and Connectivity of Graphs", Linear Algebra and its applications 114/115; 1989, pp. 439-454.

Macready, et al., "Applications of Hardware Boltzmann Fits". U.S. Appl. No. 61/515,742, filed Aug. 5, 2011, 11 ages.

Macready, et al., "Applications of Hardware Boltzmann Fits". U.S. Appl. No. 61/540,208, filed Sep. 28, 2011, 12 pages.

Macready, et al., "Applications of Hardware Boltzmann Fits". U.S. Appl. No. 61/505,044, filed Jul. 6, 2011.

Macready, et al., "Systems and Methods for Minimizing an Objective Function". U.S. Appl. No. 61/550,275, filed Oct. 21, 2011, 26 pages.

Macready, et al., "Systems and Methods for Minimizing an Objective Function". U.S. Appl. No. 61/557,783, filed Nov. 9, 2011, 45 pages.

Maddison, et al., "The concrete distribution: A continuous relaxation of discrete random variables", arXiv:1611.00712 Mar. 5, 2017. https://arxiv.org/abs/1611.00712.

Makhzani, Alireza, et al., "Adversarial Autoencoders", arXiv:1511.05644v2 [cs.LG], May 25, 2016, 16 pages.

Mandt, et al., "A Variational Analysis of Stochastic Gradient Algorithms", arXiv:1602.02666 Feb. 8, 2016. https://arxiv.org/abs/1602.02666.

Misra, et al., "Seeing through the Human Reporting Bias: Visual Classifiers from Noisy Human-Centric Labels", 2016 IEEE Conference on Computer Vision and Pattern Recognition, IEEE, 2016, pp. 2930-2939.

Misra, et al., "Visual classifiers from noisy humancentric labels". In the IEEE Conference on Computer Vision and Pattern Recognition (CVPR), 2016.

Mnih, et al., "Neural variational inference and learning in belief networks". arXiv:1402.0030 Jun. 4, 2016. https://arxiv.org/abs/1402.0030.

Mnih, et al., "Variational inference for Monte Carlo objectives". arXiv:1602.06725, Jun. 1, 2016. https://arxiv.org/abs/1602.06725.

Mnih, Andriy, et al., "Variational Inference for Monte Carlo Objectives", Proceedings of the 33rd International Conference on Machine Learning, New York, NY USA, 2016, JMLR: W&CP vol. 48, 9 pages.

Molchanov, Dmitry, et al., "Variational Dropout Sparsifies Deep Neural Networks", https://arxiv.org/pdf/1701.05369v1.pdf, Jan. 19, 2017.

Murphy, "A Brief Introduction to Graphical Models and Bayesian Networks", Oct. 14, 2001. https://www.cs.ubc.ca/~murphyk/Bayes/bayes_tutorial.pdf.

Murphy, "Machine Learning: a probalistic perspective", MIT Press, 2012. http://noiselab.ucsd.edu/ECE228/Murphy_Machine_Learning.pdf.

Muthukrishnan, et al., "Classical and quantum logic gates: an introduction to quantum computing", Quantum information seminar, )Year: 1999) 22 pages.

N. Srivastava, G. Hinton, et. al., "Dropout: A Simple Way to Prevent Neural Networks from Overtting". ICML 15 (Jun):19291958, 2014.

Neal, et al., "Mcmc Using Hamiltonian Dynamics", Handbook of Markov Chain Monte Carlo 2011.

Neven, et al., "Training a binary classifier with the quantum adiabatic algorithm", arXiv preprint arXivc:0811.0416, 2008, 11 pages.

Nowozin, Sebastian, et al., "f-GAN: Training Generative Neural Samplers using Variational Divergence Minimization", arXiv:1606.00709v1 [stat.ML], 17 pages., Jun. 2, 2016.

Olshausen, Bruno A, et al., "Emergence of simple cell receptive field properties by learning a sparse code for natural images", Nature, vol. 381, Jun. 13, 1996, pp. 607-609.

Patrini, et al., Making Neural Networks robust to label noise: a loss correction approach. arXiv: 1609.03683 (2016).

Phua, et al., "A comprehensive survey", arXiv:1009.6119 Aug. 30, 2010. https://arxiv.org/abs/1009.6119.

Pozzolo, et al., "Learned Lessons in credit card fraud detection from a practitioner perspective", Feb. 18, 2014. https://www.semanticscholar.org/paper/Learned-lessons-in-credit-card-fraud-detection-from-Pozzolo-Caelen/6d2e2a1caf5b3757ed0e8f404eabb31546d5698a.

Rasmus, Antti, et al., "Semi-Supervised Learning with Ladder Networks", arXiv:1507.02672v2 [cs.NE] Nov. 24, 2015, 19 pages.

"On the Challenges of Physical Implementations of RBMs", arXiv:1312.5258V1 [stat.ML] Dec. 18, 2013, XP-002743443, 9 pages.

Adachi, S.H. et al., "Application of Quantum Annealing to Training of Deep Neural Networks," URL:https://arxiv.org/ftp/arxiv/papers/151 0/1510.06356.pdf, Oct. 21, 2015, 18 pages.

Amin, "Effect of Local Minima on Adiabatic Quantum Optimization," Physical Review Letters 100(130503), 2008, 4 pages.

Hjelm, "Boundary-Seeking Generative Adversarial Networks", arXiv:1702.08431v4 [stat.ML], 17 pages, Feb. 21, 2018.

International Search Report and Written Opinion for PCT/US2018/065286, dated Apr. 16, 2019, 11 pages.

International Search Report and Written Opinion for PCT/US2019/017124, dated May 30, 2019, 28 pages.

International Search Report, dated May 10, 2017, for International Application No. PCT/US2017/015401, 3 pages.

International Search Report, dated Nov. 18, 2016, for International Application No. PCT/US2016/047627, 3 pages.

Jaakkola et al., "Improving the Mean Field Approximation via the Use of Mixture Distributions," 1998, 11 pages.

Jenatton, R. et al., "Proximal Methods for Hierarchical Sparse Coding," arXiv:1009.2139v4 [stat.ML], Jul. 5, 2011, 38 pages.

Katzgraber et al., "Glassy Chimeras Could Be Blind to Quantum Speedup: Designing Better Benchmarks for Quantum Annealing Machines," Physical Review X(4):021008, 2014. (8 pages).

Khalek, S. et al., "Automated SQL Query Generation for Systematic Testing of Database Engines," ASE '10: Proceedings of the IEEE/ACM international conference on Automated software engineering, 2010, 4 pages.

(56) References Cited

OTHER PUBLICATIONS

Krähenbühl, P. et al., "Efficient Inference in Fully Connected CRFs with Gaussian Edge Potentials," arXiv:1210.5644 [cs.CV], 2012, 9 pages.
Kuelka, O. et al., "Fast Estimation of First-Order Clause Coverage through Randomization and Maximum Likelihood," ICML '08: Proceedings of the 25th international conference on Machine learning, 2008, 8 pages.
Lafferty, J. et al., "Conditional Random Fields: Probabilistic Models for Segmenting and Labeling Sequence Data," Proceedings of the 18th International Conference on Machine Learning 2001,10 pages.
Li, X., et al., "Collaborative Variational Autoencoder for Recommender Systems," Published in KDD, Halifax, NS, Canada, Aug. 13-17, 2017, pp. 305-314.
Minh, V. et al., "Learning to Label Aerial Images from Noisy Data," Proceedings of the 29th International Conference on Machine Learning, Edinburgh, Scotland, 2012, 8 pages.
Mirza et al., "Conditional Generative Adversarial Nets", arXiv:1411.1784v1 [cs.LG], 7 pages, Nov. 6, 2014.
Mocanu et al., "A topological insight into restricted Boltzmann machines," Pre-print version: arXiv:1604.05978v2: Jul. 2016. (25 pages).
Murray, I. et al., "Bayesian Learning in Undirected Graphical Models: Approximate MCMC Algorithms," UAI '04: Proceedings of the 20th conference on Uncertainty in Artificial Intelligence, 2004, 8 pages.
Natarajan, N. et al., "Learning with Noisy Labels," Advances in Neural Information Processing Systems 26, 2013, 9 pages.
Neven, H. et al., "QBoost: Large Scale Classifier Training with Adiabatic Quantum Optimization," JMLR: Workshop and Conference Proceedings 25, 2012, 16 pages.
Paninski, "Estimation of Entropy and Mutual Information," Neural Computation 15:1191-1253, 2003.
Prakash, "Quantum Algorithms for Linear Algebra and Machine Learning," Doctoral Thesis, Technical Report No. UCB/EECS-2014-211, University of California at Berkeley, 2014, pp. 1-9.
Quattoni, A. et al., "Hidden Conditional Random Fields," IEEE Transactions on Pattern Analysis and Machine Intelligence, 29(10), 2007, 6 pages.
Reed et al., "Training Deep Neural Networks on Noisy Labels with Bootstrapping," arXiv:1412.6596v3 [cs.CV] Apr. 15, 2015, 11 pages.
Rezende et al., "Stochastic Backpropagation and Approximate Inference in Deep Generative Models," arXiv:1401.4082v3 [stat.ML] May 30, 2014, 14 pages.
Rolfe et al., "Discrete Variational Auto-Encoder Systems and Methods for Machine Learning Using Adiabatic Quantum Computers," U.S. Appl. No. 62/462,821, filed Feb. 23, 2017, 113 pages.
Rolfe et al., "Discrete Variational Auto-Encoder Systems and Methods for Machine Learning Using Adiabatic Quantum Computers," U.S. Appl. No. 62/404,591, filed Oct. 5, 2016, 87 pages.
Rolfe et al., "Systems and Methods for Machine Learning Using Adiabatic Quantum Computers," U.S. Appl. No. 62/207,057, filed Aug. 19, 2015, 39 pages.
Rolfe, "Discrete Variational Auto-Encoder Systems and Methods for Machine Learning Using Adiabatic Quantum Computers," U.S. Appl. No. 62/206,974, filed Aug. 19, 2015, 43 pages.
Rolfe, "Discrete Variational Auto-Encoder Systems and Methods for Machine Learning Using Adiabatic Quantum Computers," U.S. Appl. No. 62/268,321, filed Dec. 16, 2015, 52 pages.
Rolfe, "Discrete Variational Auto-Encoder Systems and Methods for Machine Learning Using Adiabatic Quantum Computers," U.S. Appl. No. 62/307,929, filed Mar. 14, 2016, 67 pages.
Rose et al., "First ever DBM trained using a quantum computer", Hack the Multiverse, Programming quantum computers for fun and profit, XP-002743440, Jan. 6, 2014, 8 pages.
Ross, S. et al., "Learning Message-Passing Inference Machines for Structured Prediction," CVPR 2011, 2011,8 pages.
Scarselli, F. et al., "The Graph Neural Network Model," IEEE Transactions on Neural Networks, vol. 20, No. 1,2009, 22 pages.
Spall, "Multivariate Stochastic Approximation Using a Simultaneous Perturbation Gradient Approximation," IEEE Transactions on Automatic Control 37(3):332-341, 1992.
Strub, F., et al. "Hybrid Collaborative Filtering with Autoencoders," arXiv:1603.00806v3 [cs.IR], Jul. 19, 2016, 10 pages.
Sukhbaatar et al., "Training Convolutional Networks with Noisy Labels," arXiv:1406.2080v4 [cs.CV] Apr. 10, 2015, 11 pages.
Tieleman, T., "Training Restricted Boltzmann Machines using Approximation to the Likelihood Gradient," ICML '08: Proceedings of the 25th international conference on Machine learning, 2008, 8 pages.
Van Baalen, M. "Deep Matrix Factorization for Recommendation," Master's Thesis, Univ.of Amsterdam, Sep. 30, 2016, URL: https://scholar.google.co.kr/scholar?q=Deep+Matrix+Factorization+for+Recommendation&hl=ko&as_sdt=O&as_vis=l&oi=scholar, 99 pages.
Van der Maaten, L. et al., "Hidden-Unit Conditional Random Fields," Journal of Machine Learning Research 15, 2011, 10 Pages.
Venkatesh, et al., "Quantum Fluctuation Theorems and Power Measurements," New J. Phys., 17, 2015, pp. 1-19.
Wang, Discovering phase transitions with unsupervised learning, Physical Review B 94, 195105 (2016), 5 pages.
Williams, "Simple Statistical Gradient-Following Algorithms for Connectionist Reinforcement Learning," College of Computer Science, Northeastern University, Boston, MA, 1992, 27 pages.
Written Opinion of the International Searching Authority, dated Nov. 18, 2016, for International Application No. PCT/US2016/047627, 9 pages.
Zhu, X. et al., "Combining Active Learning and Semi-Supervised Learning Using Gaussian Fields and Harmonic Functions," ICML 2003 workshop on the Continuum from Labeled to Unlabeled Data in Machine Learning and Data Mining, 2003, 8 pages.
Anonymous , "A Robust Learning Approach to Domain Adaptive Object Detection". CVPR, 2019.
Azadi , et al., "Auxiliary Image Regulation for Deep CNNs with Noisy Labels". arXiv:1511.07069v2 (2016).
B. Sallans and G.E. Hitton , "Reinforcement Learning with Factored States and Actions". JMLR, 5:1063-1088, 2004.
Bach , et al., "Optimization with Sparsity-Inducing Penalties". arXiv:1108.0775v2, Nov. 22, 2011.
Bahnsen , et al., "Feature Engineering Strategies for Credit Card Fraud Detection", Expert systems with applications Elsevier Jun. 1, 2016. https://www.sciencedirect.com/science/article/abs/pii/S0957417415008386?via%3Dihub.
Barron-Romero, Carlos , "Classical and Quantum Algorithms for the Boolean Satisfiability Problem", CoRR, Abs/1510.02682 )Year:2015).
Bearman , et al., "What's the Point: Semantic Segmentation with Point Supervision". ECCV, Jul. 23, 2016. https://arxiv.org/abs/1506.02106.
Bell , et al., "The "Independent Components" of Natural Scenes are Edge Filters", Vision Res. 37(23) 1997,:pp. 3327-3338.
Bellman, R. E., "Dynamic Programming". Princeton University Press, Princeton, NJ. Republished 2003: Dover, ISBN 0-486-42809-5.
Bhattacharyya , et al., "Data mining for credit card fraud: A comparitive study", Decision Support Systems 2011. https://www.semanticscholar.org/paper/Data-mining-for-credit-card-fraud%3A-A-comparative-Bhattacharyya-Jha/9d26f0ba02ee5efe9b9c7bdcb5f528c8b8253cf7.
Bian , et al., "The Ising Model: teaching an old problem new tricks", D-wave systems. 2 (year 2010), 32 pages.
Bielza, et al., "Bayesian networks in neuroscience: a survey", Oct. 16, 2014, Frontiers in Computational Neuroscience, vol. 8, Article 131, p. 1-23 (Year: 2014).
Bolton , et al., "Statistical fraud detection: A review", Statistical Science 17(3) Aug. 1, 2002. https://projecteuclid.org/journals/statistical-science/volume-17/issue-3/Statistical-Fraud-Detection-A-Review/10.1214/ss/1042727940.full.
Burda , et al., "Importance Weighted Autoencoders", arXiv:1509.00519 Nov. 7, 2016. https://arxiv.org/abs/1509.00519.
Buss , "Introduction to Inverse Kinematics with Jacobian Transpose, Pseudoinverse and Damped Least Squares methods", Mathematics UCS 2004. https://www.math.ucsd.edu/~sbuss/ResearchWeb/ikmethods/iksurvey.pdf.

(56) References Cited

OTHER PUBLICATIONS

Chen, et al., "Domain Adaptive Faster R-CNN for Object Detection in the Wild". IEEE Xplore, 2018. https://arxiv.org/abs/1803.03243.

Chen, et al., "Stochastic Gradient Hamiltonian Monte Carlo", arXiv:1402.4102 May 12, 2014. https://arxiv.org/abs/1402.4102.

Cho, Kyunghyun, et al., "On the Properties of Neural Machine Translation: Encoder-Decoder Approaches", arXiv:1409.1259v2, [cs.CL] Oct. 7, 2014, 9 pages.

Cho, K-H., Raiko, T, & Ilin, A., "Parallel tempering is efficient for learning restricted Boltzmann machines", 2010.

Courbariaux, M., et al., "Binarized Neural Networks: Training Neural Networks with Weights and Activations Constrained to +1 or −1". http://arxiv.org/pdf/1602.02830.pdf.

Dai, et al., "Generative Modeling of Convolutional Neural Networks". ICLR 2015.

Doersch, "Tutorial on variational autoencoders", arXiv:1606.05908 Jan. 3, 2021. https://arxiv.org/abs/1606.05908.

Dumoulin, et al., "On the Challenges of Physical Implementations of RBMs", https://arxiv.org/abs/1312.5258v2, Oct. 28, 2014.

Fabius, Otto, et al., "Variational Recurrent Auto-Encoders", Accepted as workshop contributions at ICLR 2015, 5 pages.

Fischer, A. & Igel, C., "A bound for the convergence rate of parallel tempering for sampling restricted Boltzmann machines", 2015.

Friedman, et al., "Learning Bayesan Networks from Data", Stanford Robotics. http://robotics.stanford.edu/people/nir/tutorial/index.html.

G. Hinton, N. Srivastava, et al., "Improving neural networks by preventing co-adaptation of feature detectors". CoRR, abs/1207.0580, 2012.

G.A. Rummery and M. Niranjan, "Online Q-Learning using Connectionist Systems". CUED/FINFENG/TR 166, Cambridge, UK, 1994.

Gal, et al., "Bayesian Convolutional Neural Networks With Bernoulli Approximate Variational Inference". arXiv:1506.02158v6, 2016.

Glynn, "Likelihood ratio gradient estimation for stochastic systems". Communications of the ACM, 1990. https://dl.acm.org/doi/10.1145/84537.84552.

Gomez-Bombarelli, et al., "Automatic chemical designs using a data-driven continuous representation of molecules", arXiv:1610.02415 Dec. 5, 2017. https://arxiv.org/abs/1610.02415.

Grathwohl, et al., "Backpropagation through the void: Optimizing control variates for black-box gradient etimation". arXiv:1711.00123, Feb. 23, 2018. https://arxiv.org/abs/1711.00123.

Gregor, et al., "Deep autoregressive networks". arXiv:1310.8499, May 20, 2014. https://arxiv.org/abs/1310.8499.

Gregor, Karol, et al., "DRAW: A Recurrent Neural Network for Image Generation", Proceedings of the 32nd International Conference on Machine Leaning, Lille, France, 2015, JMLR: W&CP vol. 37. Copyright 2015, 10 pages.

Gu, et al., "Muprop: Unbiased backpropagation for stochastic neural networks". arXiv:1511.05176, Feb. 25, 2016. https://arxiv.org/abs/1511.05176.

Hamze, "Sampling From a Set Spins With Clamping". U.S. Appl. No. 61/912,385, filed Dec. 5, 2013, 35 pages.

Hees, "Setting up a Linked Data mirror from RDF dumps". Jörn's Blog, Aug. 26, 2015. SciPy Hierarchical Clustering and Dendrogram Tutorial | Jörn's Blog (joernhees.de).

Heess, N., et al., "Actor-Critic Reinforcement Learning with Energy-based Policies". JMLR, 24:43-57, 2012.

Heidrich-Meisner, et al., "Reinforcement Learning in a Nutshell". http://image.diku.dk/igel/paper/RLiaN.pdf.

Hidasi, et al., "Session-based recommendations with recurrent neural networks", ICRL Mar. 29, 2016. https://arxiv.org/abs/1511.06939.

Hinton, Geoffrey, "A Practical Guide to Training Restricted Boltzmann Machines", Version 1, Department of Computer Science University of Toronto, Aug. 2, 2010, 21 pages.

Hurley, Barry, et al., "Proteus: A hierarchical Portfolio of Solvers and Transformations", arXiv:1306.5606v2 [cs.AI], Feb. 17, 2014, 17 pages.

Hinton, Geoffrey E, et al., "Autoencoders, Minimum Description Length and Helmholtz Free Energy", Department of Computer Science, University of Toronto, Computation Neuroscience Laboratory, the Salk Institute, Mar. 1, 2001, 9 pages.

Hinton, Geoffrey E, et al., "Reducing the Dimensionality of Data with Neural Networks", Science, wwwsciencemag.org, vol. 313, Jul. 28, 2006, pp. 504-507.

Humphrys, M., http://computing.dcu.ie/ humphrys/PhD/ch2.html.

Non Final Office Action for U.S. Appl. No. 16/270,273, dated Jun. 27, 2022, 13 pages.

Notice of Allowance for U.S. Appl. No. 16/682,976, dated May 27, 2022, 11 pages.

Notice of Allowance for U.S. Appl. No. 16/714,103, dated Jun. 3, 2022, 9 pages.

"An implementation of the high-throughput computing system using the GPU (005)", no English translations, 2019-516164, IEICE Technical Report, vol. 114 No. 302, Nov. 13-14, 2014, 12 pages.

"Cluster Analysis", UIUC, 2013.

"Neuro-computing for Parallel and Learning Information Systems", 2019-516164, www.jstage.jst.go.jp/article/sicej/1962/27/3/27_3_255/_article/-char/ja,Nov. 14, 2021, 17 pages.

Achille et Soatto, "Information Dropout: Learning Optimal Representations Through Noise" Nov. 4, 2016, ICLR, arXiv:1611.01353v1, pp. 1-12. (Year: 2016).

Hinton et al., "A Practical Guide to Training Restricted Boltzmann Machines," Springer, pp. 599-619, Jan. 1, 2012.

Hinton, Geoffrey E.. Training products of experts by minimizing contrastive divergence. Neural Computation, 14:1771-1800, 2002.

Hinton, Geoffrey, Simon Osindero, and Yee-Whye Teh. A fast learning algorithm for deep belief nets. Neural computation, 18(7):1527-1554, 2006.

International Search Report and Written Opinion of the International Searching Authority, dated Jan. 4, 2018, for International Application No. PCT/US2017/053303, 16 pages.

International Search Report and Written Opinion, dated Oct. 13, 2014, for international Application No. PCT/US2014/044421, 13 pages.

Jain et al., "Estimating the class prior and posterior from noisy positives and unlabeled data" Jun. 28, 2016, arXiv:1606.08561v1, pp. 1-19. (Year: 2016).

Japanese Office Action for Application No. JP 2019516164, dated Nov. 24, 2021, 33 pages (including English translation).

Jordan, Michael I., Zoubin Ghahramani, Tommi S Jaakkola, and Lawrence K Saul. An introduction to variational methods for graphical models. Machine learning, 37(2):183-233, 1999.

Ke et al., "Variational Convolutional Networks for Human-Centric Annotations" Nov. 20, 2016, pp. 120-135. (Year: 2016).

Korean Office Action for Application 10-2019-7012141, dated Nov. 29, 2021, 18 pages (including English translation).

Korenkevych et al., "Benchmarking Quantum Hardware for Training of Fully Visible Boltzmann Machines" Nov. 14, 2016, arXiv:1611.04528v1, pp. 1-22. (Year: 2016).

Le, Quoc, Marc' Aurelio Ranzato, Rajat Monga, Matthieu Devin, Greg Corrado, Kai Chen, Jeff Dean, and Andrew Ng. Building high-level features using large scale unsupervised learning. In ICML'2012, 2012.

Lecun, Y., L. Bottou, Y. Bengio, and P. Haffner. Gradient based learning applied to document recognition. Proc. IEEE, 1998.

Liu et Tao, "Classification with Noisy Labels by Importance Reweighting" Mar. 2016, pp. 447-461. (Year: 2016).

Long, Philip M and Rocco Servedio. Restricted boltzmann machines are hard to approximately evaluate or simulate. In Proceedings of the 27th International Conference on Machine Learning (ICML-10), pp. 703-710, 2010.

Menon et al., "Learning from Binary Labels with Instance-Dependent Corruption" May 4, 2016, pp. 1-41. (Year: 2016).

Miyata et al., "Consideration of 2D-FFT by Decomposition-of-Large Scale Data on Multi-GPU", IEICE Technical Report, vol. 114 No. 155, Computer Systems Jul. 28-30, 2014, Abstract, 12 pages.

(56) References Cited

OTHER PUBLICATIONS

Nalisnick, Eric, Lars Hertel, and Padhraic Smyth. "Approximate inference for deep latent gaussian mixtures." NIPS Workshop on Bayesian Deep Learning. vol. 2. 2016. (Year: 2016).
Niv, "Reinforcement Learning in the Brain". Journal of Mathematical Psychology, 2009—Elsevier.
Non-Final Office Action Issued in U.S. Appl. No. 15/753,661 dated Dec. 9, 2021, 15 pages.
Non-Final Office Action Issued in U.S. Appl. No. 15/822,884 dated Feb. 17, 2022, 45 pages.
Non-Final Office Action Issued in U.S. Appl. No. 16/336,625 dated Feb. 14, 2022, 22 pages.
Non-Final Office Action Issued in U.S. Appl. No. 16/562,192 dated Apr. 4, 2022, 37 pages.
Omidshafiei et al., "Hierarchical Bayesian Noise Inference for Robust Real-time Probabilistic Object Classification" Jul. 14, 2016, arXiv: 1605.01042v2, pp. 1-9. (Year: 2016).
Ororbia et al., "Online Semi-Supervised Learning with Deep Hybrid Boltzmann Machines and Denoising Autoencoders" Jan. 18, 2016, ICLR, arXiv: 1511.06964v7, pp. 1-17. (Year: 2016).
Sakkaris, et al., "QuDot Nets: Quantum Computers and Bayesian Networks", arXiv:1607.07887v1 [quant-ph] Jul. 26, 2016, 22 page.
Salimans, Tim, and David A. Knowles. "Fixed-form variational posterior approximation through stochastic linear regression." Bayesian Analysis 8.4 (2013): 837-882. (Year: 2013).
Salimans, Tim. "A structured variational auto-encoder for learning deep hierarchies of sparse features." arXiv preprint arXiv: 1602.08734 (2016). (Year: 2016).
Serban et al., "Multi-Modal Variational Encoder-Decoders" Dec. 1, 2016, arXiv: 1612.00377v1, pp. 1-18. (Year: 2016).
Shah et al., "Feeling the Bern: Adaptive Estimators for Bernoulli Probabilities of Pairwise Comparisons" Mar. 22, 2016, pp. 1-33. Year: 2016).
Somma, R., S Boixo, and H Barnum. Quantum simulated annealing. arXiv preprint arXiv:0712.1008, 2007.
Somma, RD, S Boixo, H Barnum, and E Knill. Quantum simulations of classical annealing processes. Physical review letters, 101(13):130504, 2008.
Suzuki, "Natural quantum reservoir computing for temporal information processing", Scientific Reports, Nature Portfolio, Jan. 25, 2022.
Tosh, Christopher, "Mixing Rates for the Alternating Gibbs Sampler over Restricted Boltzmann Machines and Friends" Jun. 2016.Year: 2016).
Tucci, "Use of a Quantum Computer to do Importance and Metropolis-Hastings Sampling of a Classical Bayesian Network", arXiv:0811.1792v1 [quant-ph] Nov. 12, 2008, 41 pages.
Van de Meent, J-W., Paige, B., & Wood, "Tempering by subsampling", 2014.
Wang et al., "Paired Restricted Boltzmann Machine for Linked Data" Oct. 2016. (Year: 2016).
Wang, W., Machta, J., & Katzgraber, H. G. "Population annealing: Theory and applications in spin glasses", 2015.
Xu et Ou "Joint Stochastic Approximation Learning of Helmholtz Machines" Mar. 20, 2016, ICLR arXiv: 1603.06170v1, pp. 1-8. (Year: 2016).
Yoshihara et al., "Estimating the Trend of Economic Indicators by Deep Learning", 2019-516164, Graduate School of System Informatics, Kobe University, 28 Annual Conferences of Japanese Society for Artificial Intelligence 2014, 10 pages.
Zhang et al., "Understanding Deep Learning Requires Re-Thinking Generalization", arXiv:1611.03530 Feb. 26, 2017. https://arxiv.org/abs/1611.03530.
Zhao et al., "Towards a Deeper Understanding of Variational Autoencoding Models", arXiv:1702.08658 Feb. 28, 2017. https://arxiv.org/abs/1702.08658.
Zojaji et al., "A Survey of Credit Card Fraud Detection Techniques: Data and Technique Oriented Perspective", arXiv:1611.06439 Nov. 19, 2016. https://arxiv.org/abs/1611.06439.
Chen et al., "Variational Lossy Autoencoder" Nov. 8, 2016, arXiv: 1611.02731v1, pp. 1-13. (Year: 2016).
Covington, et al., "Deep Neural Networks for YouTube Recommendations", RecSys '16, Sep. 15-19, 2016, Boston MA,8 pages.
Dziugaite, et al., "Neural Network Matrix Factorization", arXiv:1511.06443v2 [cs.LG] Dec. 15, 2015, 7 pages.
Kingma et al., "Improving Variational Inference with Inverse Autoregressive Flow" Jun. 15, 2016, arXiv:1606.04934v1, pp. 1-10. ( Year: 2016).
Marlin, et al., "Collaborative Prediction and Ranking with Non-Random Missing Data", RecSys'09, Oct. 23-25, 2009, New York, New York, USA., 8 pages.
Non-Final Office Action Issued in U.S. Appl. No. 16/779,035, dated Aug. 17, 2022, 16 pages.
Notice of Allowance for U.S. Appl. No. 15/822,884, dated Aug. 8, 2022, 13 pages.
Notice of Allowance for U.S. Appl. No. 16/772,094, dated Jun. 29, 2022, 12 pages.
Oord, et al., "Pixel Recurrent Neural Networks", 33rd International Conference on Machine Learning, New York, NY, USA, 2016. JMLR: W&CP vol. 48, 10 pages. 48.
Rolfe, Jason Tyler "Discrete Variational Autoencoders" Sep. 7, 2016, arXiv: 1609.02200v1, pp. 1-29. (Year: 2016).
Salakhutdinov, et al., "Restricted Boltzmann Machines for Collaborative Filtering", International Conference on Machine Learning, Corvallis, OR, 2007, 8 pages.
Sedhain, et al., "AutoRec: Autoencoders Meet Collaborative Filtering", WWW 2015 Companion, May 18-22, 2015, Florence, Italy, 2 pages.
Van Rooyen, et al., "Learning with Symmetric Label Noise: The Importance of Being Unhinged" May 28, 2015, arXiv: 1505.07634v1, pp. 1-30. (Year: 2016).
Amin, M., "Searching for Quantum Speedup in Quasistatic Quantum Annealers," arXiv:1503.04216v2 [quant-ph] Nov. 19, 2015, 5 pages.
Berkley, A.J. et al., "Tunneling Spectroscopy Using a Probe Qubit," arXiv:1210.6310v2 [cond-mat.supr-con], Jan. 3, 2013, 5 pages.
Brown, et al., "A fault-tolerant non-Clifford gate for the surface code in two dimensions", Science Advances, May 22, 2020, vol. 6, Issue 21, 25 pages.
Calderbank, et al., "Good quantum error-correcting codes exist", Phys. Rev. A54, 1098—Published Aug. 1, 2996, 4 pages.
Childs, "Quantum Information Processing in Continuous Time", MIT (2004) Thesis (Year:2004), 140 pages.
Conway et al., Quantum Computing in the Real World, IDC Technology Spotlight, Apr. 2016.
Harris et al., "Experimental Demonstration of a Robust and Scalable Flux Qubit," arXiv:0909.4321v1, Sep. 24, 2009, 20 pages.
International Search Report for PCT Application No. PCT/US2017/036387 dated Oct. 20, 2017, 3 pages.
Johnson et al., "Scalable Control System for a Superconducting Adiabatic Quantum Optimization Processor," Superconductor Science & Technology (2010).
King et al., "Observation of topological phenomena in a programmable lattice of 1,800 qubits", arXiv:1803.02047 [quant-ph], Mar. 6, 2018, 17 pages.
Knill, Fault-Tolerant Postselected Quantum Computation: Schemes, arXiv:quant-ph/0402171v1, Feb. 23, 2004, 17 pages.
Krzakala et al., On the path integral representation for quantum spin models and its application to the quantum cavity method and to Monte Carlo simulations, arXiv:0807.2553v2[cond-mat.stat-mech], Oct. 21, 2008.
Lanting et al., "Entanglement in a Quantum Annealing Processor," Physical Review X 4:021041, 2014. (14 pages).
Lanting et al., "Systems and Methods for Quantum Computation Employing Classical Spin Preparation and Reverse Annealing," U.S. Appl. No. 62/417,940, filed Nov. 4, 2016, 57 pages.
Lanting, "Systems and Methods for Quantum Computation Employing Classical Spin Preparation and Reverse Annealing," U.S. Appl. No. 62/364,169, filed Jul. 19, 2016, 42 pages.
Nagayama, et al., "Surface code error correction on a defective lattice", IOP Publishing, New J. Phys. 19 (2017) 29 pages.

(56) References Cited

OTHER PUBLICATIONS

Non Final Office Action for U.S. Appl. No. 16/858,108, dated Sep. 21, 2022, 24 pages.
Somma, et al., "Quantum Speedup by Quantum Annealing", Physical Review Letters (2012) (year:2012), 5 pages.
Written Opinion for PCT Application No. PCT/US2017/036387 dated Oct. 20, 2017, 11 pages.
Neal, Radford M, "Annealed Importance Sampling", arXiv:physics/9803008 [physics.comp-ph], Sep. 4, 1998, 25 pages.
Orivati, Andrea , Our Top 10 Patent Picks From 2019. InQuartik. Retrieved May 29, 2020. https://www.inquartik.com/inqo-2019-most-important-patents/.
Amin et al., "Quatum Boltzmann Machine". arXiv:1601.02036v1, Jan. 8, 2016.
Chancellor, "Modernizing Quantum Annealing Using Local Searches", arXiv:1606.06833v1 [quant-ph] Jun. 22, 2016, 22 pages.
Clausen, J., "Branch and Bound Alogrithms", Mar. 12, 1999, 30 pages.
Dickson et al., "Thermally Assisted Quantum Annealing of a 16-Qubit Problem," Nature Communications, 2013, 6 pages.
Harris et al., "Experimental Investigation of an Eight-Qubit Unit Cell in a Superconducting Optimization Processor," arXiv:1004.1628v2, Jun. 28, 2010, 16 pages.
Hen et al., "Solving the Graph Isomorphism Problem with a Quantum Annealer," arXiv:1207.1712v2, Aug. 8, 2012, 9 pages.
Johnson et al., "Quantum annealing with manufactured spins," Nature 473:194-198, May 12, 2011.
Notice of Allowance for U.S. Appl. No. 17/584,600, dated Jan. 19, 2023, 10 pages.
Propson, T., "Robust Quantum Optimal Control", arXiv:2103.15716v1, Mar. 29, 2021. 14 pages.
Altshuler, et al., "Anderson localization casts clouds over adiabatic quantum optimization", arXiv:0912.0746v1 [quant-ph] Dec. 3, 2009, 14 pages.
Byrd. "A Limited-Memory Algorithm for Bound-Contrained Optimization". SIAM Journal on Scientific Computing, Jun. 17, 2005.
Chiorescu, et al. "Coherent Quantum Dynamics of a Superconducting Flux Qubit", Science Feb. 13, 2003, vol. 299, Issue 5614-pp. 1869-1871.
Kerman et al., "Quantum Enhanced Optimization: Experimental Study Overview", IARPA, Oct. 26, 2015.
Mohseni, et al., "Environment-Assisted Quantum Walks in Photosynthetic Energy Transfer", arXiv: 0805.2741v2 [quant-ph] Oct. 14, 2008, 9 pages.
Oliver, "Quantum Enhanced Optimization: Experimental Study Overview", IARPA, Oct. 26, 2015.
Pudenz, et al., "Error corrected quantum annealing with hundreds of qubits", arXiv:1307.8190v1 [quant-ph] Jul. 31, 2013, 18 pages.
Notice of Allowance for U.S. Appl. No. 16/858,108, dated Aug. 22, 2023, 12 pages.
Santra, et al., "Exponential capacity of associative memories under quantum annealing recall," arXiv:1602.0819 [quant-ph] Feb. 25, 2016, 9 pages.
Temme, et al., "Error mitigation for short-depth quantum circuits", arXiv:1612.02058v3 [quant-ph], Nov. 6, 2017.

* cited by examiner

SYSTEMS AND METHODS FOR HYBRID QUANTUM-CLASSICAL COMPUTING

BACKGROUND

Field

This disclosure generally relates to systems and methods for solving computational problems and may particularly be useful in hybrid computing employing a quantum processor and classical processor.

Solvers

A solver is a mathematical-based set of instructions executed via hardware circuitry that is designed to solve mathematical problems.

There are numerous solvers available, most of which are designed to execute on classical computing hardware, that is computing hardware that employs digital processors and/or digital processor-readable nontransitory storage media (e.g., volatile memory, non-volatile memory, disk-based media). More recently, solvers designed to execute on non-classical computing hardware are becoming available, for example solvers designed to execute on analog computers, for instance an analog computer including a quantum processor.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is given by:

$$H_e = (1-s)H_i + sH_f$$

where $H_i$ is the initial Hamiltonian, $H_f$ is the final Hamiltonian, $H_e$ is the evolution or instantaneous Hamiltonian, and s is an evolution coefficient which controls the rate of evolution. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. The process of changing the Hamiltonian in adiabatic quantum computing may be referred to as evolution.

Quantum Annealing

Quantum annealing is a computation method that may be used to find a low-energy state, typically preferably the ground state, of a system. The method relies on the underlying principle that natural systems tend towards lower energy states because lower energy states are more stable. Quantum annealing may use quantum effects, such as quantum tunneling, to reach a low-energy state; however, the final low-energy state may not be the global energy minimum. Adiabatic quantum computation, therefore, may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

Quantum Processor

A quantum processor may take the form of a superconducting quantum processor. A superconducting quantum processor may include a number of qubits and associated local bias devices. A superconducting quantum processor may also employ couplers to provide tunable communicative connections between qubits. A qubit often will have more devices associated with it. Further details and embodiments of exemplary quantum processors that may be used in conjunction with the present systems and devices are described in, for example, U.S. Pat. Nos. 7,533,068; 8,008,942; 8,195,596; 8,190,548; and 8,421,053.

Many techniques for using quantum annealing to solve computational problems involve finding ways to directly map/embed a representation of a problem to the quantum processor. Generally, a problem is solved by first casting the problem in a contrived formulation (e.g., Ising spin glass, QUBO, etc.) because that particular formulation maps directly to the particular embodiment of the quantum processor being employed. An Ising spin glass with N variables, or spins $s \in [-1, +1]$, may be written as a cost function of the form:

$$E(s) = \sum_i^N h_i s_i + \sum_{i<j} J_{ij} s_i s_j$$

where $h_i$ and $J_{ij}$ are dimensionless quantities that specify a desired Ising spin glass instance. Solving this problem involves finding the spin configuration $s_i$ that minimizes E for the particular set of $h_i$ and $J_{ij}$ provided.

Hybrid Computing System Comprising a Quantum Processor

A hybrid computing system can include a digital computer communicatively coupled to an analog computer. In some implementations, the analog computer is a quantum computer and the digital computer is a classical computer.

The digital computer can include a digital processor that can be used to perform classical digital processing tasks described in the present systems and methods. The digital computer can include at least one system memory which can be used to store various sets of computer- or processor-readable instructions, application programs and/or data.

The quantum computer can include a quantum processor that includes programmable elements such as qubits, couplers, and other devices. The qubits can be read out via a readout system, and the results communicated to the digital computer. The qubits and the couplers can be controlled by a qubit control system and a coupler control system, respectively. In some implementations, the qubit and the coupler control systems can be used to implement quantum annealing on the analog computer.

Sampling

Throughout this specification and the appended claims, the terms "sample", "sampling", "sampling device", and "sample generator" are used. These terms are used herein in like manner to their corresponding uses in the arts of statistics and statistical analysis, and electrical engineering.

In statistics, a sample is a subset of a population, i.e., a selection of data taken from a statistical population. Sampling is the process of taking the sample, and typically follows a defined procedure. For example, in a population, database, or collection of objects, a sample may refer to an individual datum, data point, object, or subset of data, data points, and/or objects.

In electrical engineering and related disciplines, sampling relates to taking a set of measurements of an analog signal or some other physical system. Sampling may include conversion of a continuous signal to a discrete signal.

In many fields, including simulations of physical systems, and computing, especially analog computing, the foregoing meanings may merge. For example, a hybrid computer can draw samples from an analog computer. The analog computer, as a provider of samples, is an example of a sample generator. The analog computer can be operated to provide samples from a selected probability distribution, the probability distribution assigning a respective probability of being sampled to each data point in the population.

Branch-and-Bound

A Branch-and-Bound (also referred to herein as "B&B") algorithm is an exact solver that searches the complete space of solutions for a given problem for an exact solution, or multiple optimal solutions where they exist. A B&B algorithm can include a systematic enumeration of candidate solutions by a search of a state space. A Branch and Bound algorithm searches parts of the solution space only implicitly, thanks to use of bounds combined with the value of the current candidate optimal solution. Clausen (Jens Clausen, Branch and Bound Algorithms http://www.imada.sdu.dk/~bi/DM85/TSPtext.pdf) describes the generic classical B&B algorithm as follows:

The problem is to minimize a function $f(x)$ of variables $(x1 \ldots xn)$ over a region of feasible solutions, S: $minx \in S$ $f(x)$.

The function f is called the objective function and may be of any type. The set of feasible solutions is usually determined by general conditions on the variables, e.g. that these must be non-negative integers or binary, and special constraints determining the structure of the feasible set. In many cases, a set of potential solutions, P, containing S, for which f is still well defined, naturally comes to mind, and often, a function $g(x)$ defined on S (or P) with the property that $g(x) \leq f(x)$ for all x in S (resp. P) arises naturally.

The solution of a problem with a B&B algorithm is traditionally described as a search through a search tree, in which the root node corresponds to the original problem to be solved, and each other node corresponds to a subproblem of the original problem. Given a node Q of the tree, the children of Q are subproblems derived from Q through imposing (usually) a single new constraint for each subproblem, and the descendants of Q are those subproblems, which satisfy the same constraints as Q and additionally a number of others. The leaves correspond to feasible solutions, and for all N P-hard problems, instances exist with an exponential number of leaves in the search tree. To each node in the tree a bounding function g associates a real number called the bound for the node. For leaves the bound equals the value of the corresponding solution, whereas for internal nodes the value is a lower bound for the value of any solution in the subspace corresponding to the node. Usually g is required to satisfy the following three conditions:

1. $g(Pi) \leq f(Pi)$ for all nodes Pi in the tree
2. $g(Pi) = f(Pi)$ for all leaves in the tree
3. $g(Pi) \geq g(Pi)$ if Pi is the father of Pi These state that g is a bounding function, which for any leaf agrees with the objective function, and which provides closer and closer (or rather not worse) bounds when more information in terms of extra constraints for a subproblem is added to the problem description.

A B&B algorithm for a minimization problem hence consists of three main components: 1. a bounding function providing for a given subspace of the solution space a lower bound for the best solution value obtainable in the subspace, 2. a strategy for selecting the live solution subspace to be investigated in the current iteration, and 3. a branching rule to be applied if a subspace after investigation cannot be discarded, hereby subdividing the subspace considered into two or more subspaces to be investigated in subsequent iterations. Bounding functions naturally arise in connection with the set of potential solutions P and the function g. Due to the fact that $S \subseteq P$, and that $g(x) \leq f(x)$ on P, the following is easily seen to hold:

$minx \in P$ $g(x) \leq (minx \in P$ $f(x)$ $minx \in S$ $g(x)) \leq minx \in S$ $f(x)$ If both of P and g exist there are now a choice between three optimization problems, for each of which the optimal solution will provide a lower bound for the given objective function. The "skill" here is of course to chose P and/or g so that one of these is easy to solve and provides tight bounds. Hence there are two standard ways of converting the N P-hard problem of solving a subproblem to optimality into a P-problem of determining a lower bound for the objective function.

The first is to use relaxation—leave out some of the constraints of the original problem thereby enlarging the set of feasible solutions. The objective function of the problem is maintained. This corresponds to minimizing f over P. If the optimal solution to the relaxed subproblem satisfies all constraints of the original subproblem, it is also optimal for this, and is hence a candidate for a new incumbent. Otherwise, the value is a lower bound because the minimization is performed over a larger set of values than the objective function values for feasible solutions to the original problem.

The other way of obtaining an easy bound calculation problem is to minimize g over S, i.e. to maintain the feasible region of the problem, but modify the objective function at the same time ensuring that for all feasible solutions the modified function has values less than or equal to the original function.

Combining the two strategies for finding bounding functions means to minimize g over P, and at first glance this seems weaker than each of those. However, a parameterized family of lower bounds may result, and finding the parameter giving the optimal lower bound may after all create very tight bounds. Bounds calculated by so-called Lagrangean relaxation are based on this observation—these bounds are usually very tight but computationally demanding.

The strategy for selecting the next live subproblem to investigate usually reflects a trade off between keeping the number of explored nodes in the search tree low, and staying within the memory capacity of the computer used. If one always selects among the live subproblems one of those with the lowest bound, called the best first search strategy, BeFS, no superfluous bound calculations take place after the optimal solution has been found.

The alternative used is depth first search, DFS. Here a live node with largest level in the search tree is chosen for exploration. The memory requirement in terms of number of subproblems to store at the same time is now bounded above by the number of levels in the search tree multiplied by the maximum number of children of any node, which is usually a quite manageable number. An advantage from the programming point of view is the use of recursion to search the tree—this enables one to store the information about the current subproblem in an incremental way, so only the constraints added in connection with the creation of each subproblem need to be stored. The drawback is that if the incumbent is far from the optimal solution, large amounts of unnecessary bounding computations may take place.

In order to avoid this, DFS is often combined with a selection strategy, in which one of the branches of the selected node has a very small lower bound and the other a very large one. The idea is that exploring the node with the small lower bound first hopefully leads to a good feasible solution, which when the procedure returns to the node with the large lower bound can be used to fathom the node. The node selected for branching is chosen as the one, for which the difference between the lower bounds of its children is as large as possible. Note however that this strategy requires the bound values for children to be known, which again may lead to superfluous calculations.

A combination of DFS as the overall principle and BeFS when choice is to be made between nodes at the same level of the tree is also quite common.

BRIEF SUMMARY

A method of operation in a computational system is described, the computational system comprising a quantum processor and at least one non-quantum processor. The method may be summarized as including: causing a solver to be executed by the quantum processor to generate a plurality of samples as potential solutions to a problem having at least one optimal solution; and causing an exact algorithm to be performed on the plurality of samples by the at least one non-quantum processor to generate the at least one optimal solution to the problem.

Causing a solver to be executed by the quantum processor to generate a plurality of samples as potential solutions to a problem may include causing the solver to embed the problem into a regular structure to produce an embedded problem and causing the solver to be executed by the quantum processor to generate the plurality of samples from the embedded problem. Causing a solver to embed the problem into a regular structure to produce an embedded problem may include causing the solver to embed the problem into a topology of the quantum processor to produce an embedded problem.

Causing an exact algorithm to be performed on the plurality of samples by the at least one non-quantum processor to generate the at least one optimal solution to the problem, may include causing a Branch and Bound algorithm to be executed on the embedded problem to generate the at least one optimal solution to the problem. Causing a Branch and Bound algorithm to be executed on the embedded problem may further include computing bounds using the plurality of samples and computing magnetizations and correlations of the plurality of samples. Computing the magnetizations and correlations of the plurality of samples may include statistically analyzing the plurality of samples.

The method may further include iteratively repeating causing a solver to be executed by the quantum processor to generate a plurality of samples as potential solutions to the problem before causing the exact algorithm to be performed on the plurality of samples by the at least one non-quantum processor to generate the at least one optimal solution to the problem.

Causing an exact algorithm to be performed on the plurality of samples by the at least one non-quantum processor to generate an optimal solution to the problem, may include causing an exact algorithm to be performed on the plurality of samples by the at least one non-quantum processor to generate multiple optimal solutions.

The method may include the solver being caused to execute on the quantum processor to generate a plurality of samples concurrently with the exact algorithm being caused to perform on the problem by the at least one non-quantum processor, overlapping at least a portion thereof. The exact algorithm may be updated to perform on the plurality of samples generated from the quantum processor.

A computational system may be summarized as including a quantum processor and at least one non-quantum processor. The at least one non-quantum processor may be operable to: cause a solver to be executed by the quantum processor to generate a plurality of samples as potential solutions to a problem having at least one optimal solution; and cause an exact algorithm to be performed on the plurality of samples to generate the at least one optimal solution to the problem.

The at least one non-quantum processor may cause the solver to embed the problem in a regular structure to produce an embedded problem and causes the solver to be executed by the quantum processor on the embedded problem to generate a plurality of samples as potential solutions to the problem. The at least one non-quantum processor may cause the solver to embed the problem into a topology of the quantum processor to produce an embedded problem. The exact algorithm may be a Branch and Bound algorithm. The at least one non-quantum processor may use the plurality of samples to compute bounds, magnetizations and correlations of the plurality of samples. The at least one non-quantum processor may statistically analyze the plurality of samples.

The at least one non-quantum processor may be further operable to iteratively cause a solver to be executed by the quantum processor to generate a plurality of samples as potential solutions to the problem. The at least one non-quantum processor is operable to cause at least one exact algorithm to be performed on the plurality of samples to generate multiple optimal solutions.

The at least one non-quantum processor may be operable to cause the solver to execute on the quantum processor to generate a plurality of samples concurrently with causing the exact algorithm to be performed on the problem by the at least one non-quantum processor, overlapping at least a portion thereof. The at least one non-quantum processor is operable to cause the exact algorithm to be updated to perform on the plurality of samples generated from the quantum processor.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with digital processors, such as digital microprocessors, digital signal processors (DSPs), digital graphical processing units (GPUs), field programmable gate arrays (FPGAs); analog or quantum processors, such as quantum devices, coupling devices, and associated control systems including microprocessors, processor-readable nontransitory storage media, and drive circuitry have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

The headings provided herein are for convenience only and do not interpret the scope or meaning of the embodiments.

Figure 1:
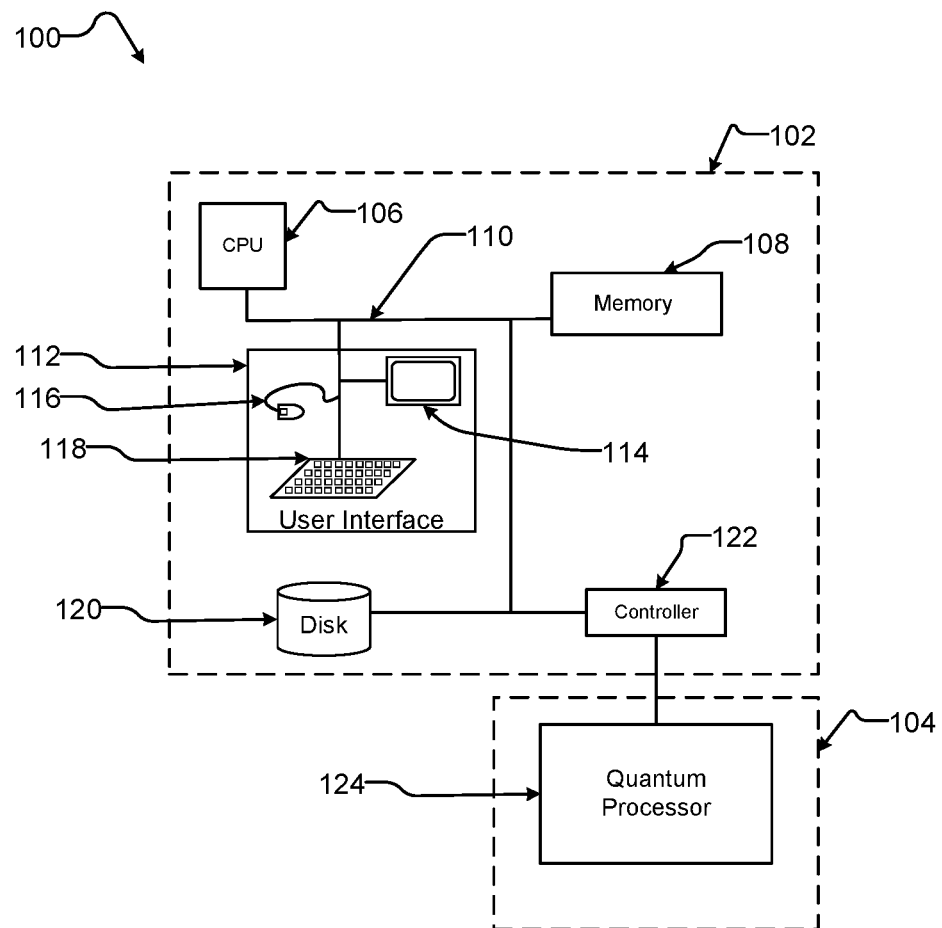
FIG. 1 is a schematic diagram of a hybrid computing system including a classical processor coupled to a quantum processor.

FIG. 1 illustrates a hybrid computing system 100 including a classical computer 102 coupled to a quantum computer 104. The example classical computer 102 includes a digital processor (CPU) 106 that may be used to perform classical digital processing tasks.

Classical computer 102 may include at least one digital processor (such as central processor unit 106 with one or more cores), at least one system memory 108, and at least one system bus 110 that couples various system components, including system memory 108 to central processor unit 106. The digital processor may be any logic processing unit, such as one or more central processing units ("CPUs"), graphics processing units ("GPUs"), digital signal processors ("DSPs"), application-specific integrated circuits ("ASICs"), programmable gate arrays ("FPGAs"), programmable logic controllers (PLCs), etc.

Classical computer 102 may include a user input/output subsystem 112. In some implementations, the user input/output subsystem includes one or more user input/output components such as a display 114, mouse 116, and/or keyboard 118.

System bus 110 can employ any known bus structures or architectures, including a memory bus with a memory controller, a peripheral bus, and a local bus. System memory 108 may include non-volatile memory, such as read-only memory ("ROM"), static random-access memory ("SRAM"), Flash NANO; and volatile memory such as random-access memory ("RAM") (not shown).

Classical computer 102 may also include other non-transitory computer or processor-readable storage media or non-volatile memory 120. Non-volatile memory 120 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 120 may communicate with the digital processor via system bus 110 and may include appropriate interfaces or controllers 122 coupled to system bus 110. Non-volatile memory 120 may serve as long-term storage for processor- or computer-readable instructions, data structures, or other data (sometimes called program modules) for classical computer 102.

Although classical computer 102 has been described as employing hard disks, optical disks and/or magnetic disks, those skilled in the relevant art will appreciate that other types of non-volatile computer-readable media may be employed, such magnetic cassettes, flash memory cards, Flash, ROMs, smart cards, etc. Those skilled in the relevant art will appreciate that some computer architectures employ volatile memory and non-volatile memory. For example, data in volatile memory can be cached to non-volatile memory, or a solid-state disk that employs integrated circuits to provide non-volatile memory.

Various processor- or computer-readable instructions, data structures, or other data can be stored in system memory 108. For example, system memory 108 may store instruction for communicating with remote clients and scheduling use of resources including resources on the classical computer 102 and quantum computer 104. For example, the system memory 108 may store processor- or computer-readable instructions, data structures, or other data which, when executed by a processor or computer causes the processor(s) or computer(s) to execute one, more or all of the acts of the methods 200 (FIG. 2), 300 (FIG. 3) and/or 400 (FIG. 4).

In some implementations system memory 108 may store processor- or computer-readable calculation instructions to perform pre-processing, co-processing, and post-processing to quantum computer 104. System memory 108 may store at set of quantum computer interface instructions to interact with quantum computer 104.

Quantum computer 104 may include one or more quantum processors such as quantum processor 124. Quantum computer 104 can be provided in an isolated environment, for example, in an isolated environment that shields the internal elements of the quantum computer from heat, magnetic field, and other external noise (not shown). Quantum processor 124 includes programmable elements such as qubits, couplers and other devices. In accordance with the present disclosure, a quantum processor, such as quantum processor 124, may be designed to perform quantum annealing and/or adiabatic quantum computation. Example of quantum processor are described in U.S. Pat. No. 7,533,068.

The systems and methods described in the present application include a hybrid quantum-classical approach for solving computational problems in which results from a quantum processor are combined with an exact method executed on a classical processor. This technique is referred in the present disclosure as a hybrid quantum-classical exact solver.

Combinatorial optimization is an example of a computational problem that can be solved with a hybrid quantum-classical exact solver. Combinatorial optimization includes finding an optimal object from a finite set of objects.

In combinatorial optimization an exact method, or exact algorithm, can include reading an input, generating a solution, and certifying that the solution is an optimal solution. While some algorithms can find an optimal solution to a problem, they do not provide any additional information to allow a user to certify that the solution is an optimal solution. An exact algorithm, by definition, finds an optimal solution and it is constructed in such a way that a user knows that the solution produced by the algorithm is optimal. This is know as a certificate of optimality, where the guarantee of optimality depends on how the algorithm works. An example of a classical algorithm that is an exact algorithm is Branch and Bound. An exact method is also referred to in the present application as a complete method. An exhaustive search is also referred to in the present application as a brute-force search. An exhaustive search can include systematically enumerating candidate solutions and testing each candidate solution to determine whether the candidate solution is optimal. A shortcoming of an exact method, such as an exhaustive search, is that the time taken to find the optimal object grows with the number of objects in the finite set of objects. In some cases, the time taken to return an optimal solution can become too large to be of practical use. Additionally, the computational time to perform or execute an exact method can depend on the quality of a lower bound, in which case a further shortcoming of an exact method is that the lower bound is typically found using a heuristic, which may return a lower bond of poor quality. The systems and methods described in the present application include using samples from a quantum processor to estimate a lower bound for an exact method; therefore providing a computational speedup to the exact method.

Quantum processors can be advantageously employed to generate candidate solutions to a combinatorial optimization problem. Since quantum processors (e.g., quantum annealers) can be probabilistic, they are unable to certify that a solution is an optimal solution. Therefore, it may not be possible to only use a quantum processor for applications where a certified optimal solution is required.

A hybrid quantum-classical exact solver addresses this problem by combining outputs from a quantum annealing processor with a classical exact algorithm that is modified to exploit properties of the quantum computation.

The quantum processor can have a native hardware graph, over which outputs from computation of the quantum processor are defined. Solutions from a quantum computation are therefore embedded in a regular structure, the native hardware graph. A native hardware graph of a quantum processor can be, for example, a Chimera graph, as described in U.S. Pat. No. 7,533,068. Other examples of hardware graphs are described in International Patent Publication No WO2017214331A1.

The exact method executed on a classical processor can be a Branch and Bound (B&B) algorithm. B&B (Jens Clausen, Branch and Bound Algorithms http://www.imada.sdu.dk/~bj/DM85/TSPtext.pdf) is an exact solver that searches the complete space of solutions for a given problem for an exact solution, or multiple optimal solutions where they exist. A B&B algorithm can include a systematic enumeration of candidate solutions by a search of a state space. A Branch and Bound algorithm searches parts of the solution space only implicitly, thanks to use of bounds combined with the value of the current candidate optimal solution. The algorithm describes the status of the solution with respect to the search of the solution space by a pool of yet unexplored subset of the solution space and the best solution found so far. Initially, only one subset exists, i.e., the entire solution space, and the best energy found so far is 00 (e.g., the best solution found has infinite energy). The unexplored spaces are represented as nodes in a dynamically generated search tree.

A B&B algorithm selects nodes to explore in a search tree, which initially only contains the root, calculates a bounding function and branches the solution space. The leaves of the search tree correspond to all possible solutions starting from the root node. The bounding function is compared to the current best solution to determine if a subspace could contain the optimal solution, in which case the subspace is explored, otherwise discarded. A B&B algorithm can return multiple optimal solutions where they exist. This is referred to in the present application as solving a problem in #-P (pronounced sharp-P), as opposed to NP.

The systems and methods described in the present application include combining a B&B algorithm with quantum samples to extend the capabilities of a quantum processor to a use-case that requires optimality, and/or to a use-case that requires complete enumeration of optimal solutions or optimal inputs. The systems and methods described in the present application can include applying an exact algorithm (i.e., an exact method), for example a Branch and Bound algorithm, to the results from a quantum processor where the exact algorithm can provide a certificate of optimality of a solution.

A Branch and Bound algorithm can be modified to exploit properties of quantum computation including: a) the sampling of multiple low-energy solutions by a quantum processor, and b) the embedding of solutions in a regular structure such as a native hardware graph of a quantum processor.

B&B algorithms use heuristics to determine an initial bound. A hybrid quantum-classical exact solver that uses sampling from a quantum processor may improve the initial bound, thus resulting in a speedup.

As described below, a hybrid quantum-classical exact solver can include a combining of solution samples defined on a native hardware graph of a quantum processor with a modified B&B algorithm. A regular graph structure, for example the Chimera graph as described in U.S. Pat. No. 7,533,068, may be exploited to improve the bounding function of the B&B algorithm. In addition, a modified B&B algorithm can exploit the property of chains in embedded problems, leading to an improved bounding function. An improved bounding function can lead to faster computation times. Similarly, any type of regularity would make possible the option of memorizing certain computations, thus saving computation time. In the present application and the appended claims, the term 'Themoizing' or 'Themoization' is used to refer to an optimization technique that stores the results of computation and returning the cached result when the same inputs occur again.

A hybrid quantum-classical exact solver can use the statistics of sample solutions from a quantum processor to select the ordering of branches to explore in the search tree that are more likely to contain optimal solutions or branches that improve the bound, thus achieving a computational speedup. For example, the hybrid quantum-classical solver may use the sample magnetization to determine the top-down order in which nodes are to be considered. The hybrid quantum-classical exact solver can include seeding a B&B algorithm with multiple samples, for example multiple samples from a quantum processor.

Figure 2:
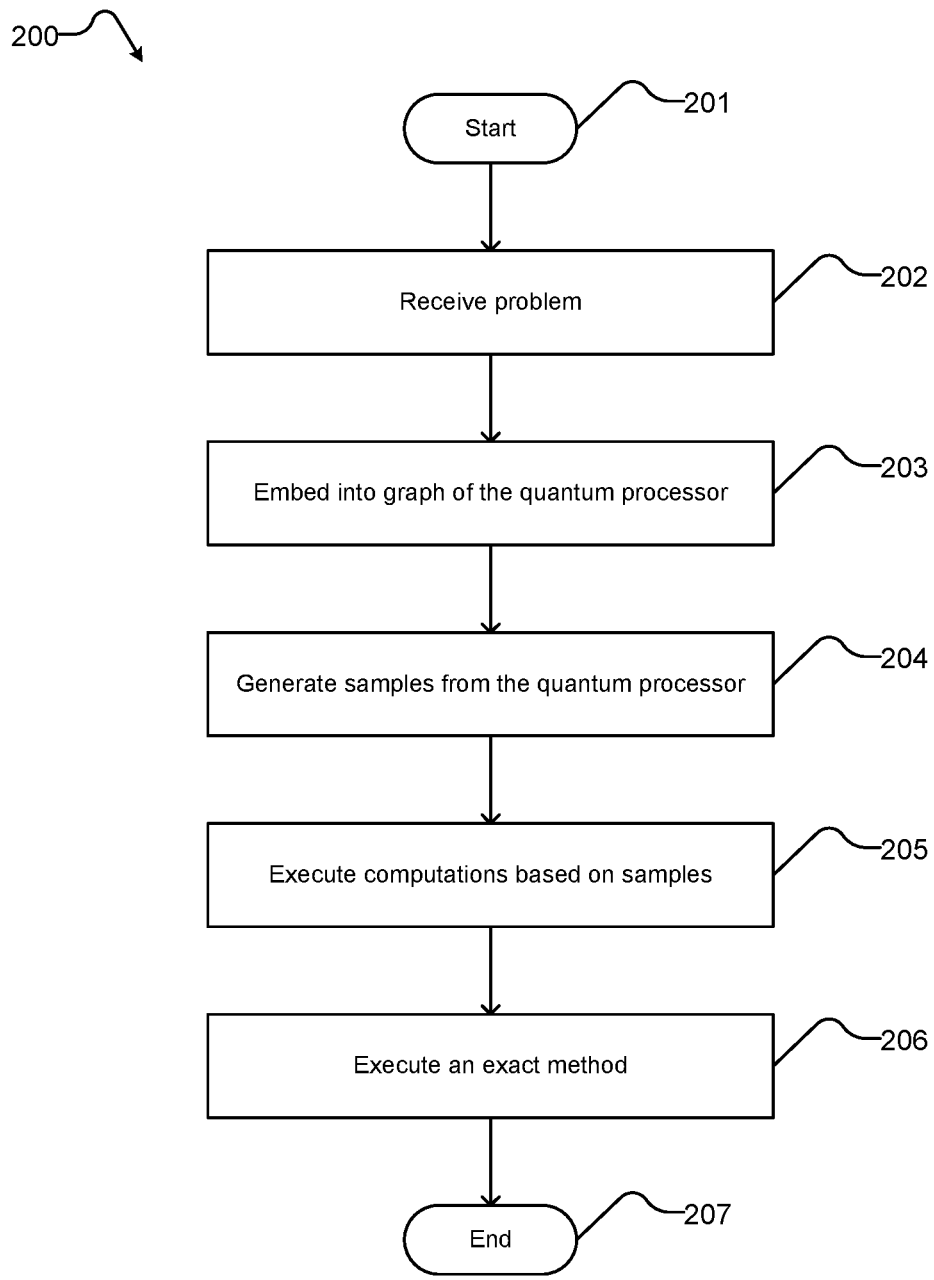
FIG. 2 is a flow chart of an example method for hybrid computation to obtain an exact solution.

FIG. 2 is a flow chart of an example hybrid quantum-classical exact method 200 for hybrid computation to obtain an exact solution. Method 200 comprises acts 201 to 207; however, a person skilled in the art will understand that the number of acts is an example, and, in some implementations, certain acts may be omitted, further acts may be added, and/or the order of the acts may be changed. Method 200 may be executed on a hybrid computing system and will be described with reference to hybrid computing system 100 of FIG. 1.

Method 200 starts at 201, for example in response to a call from another routine.

At 202, hybrid computing system 100 receives a problem for which an optimal solution is required. For example, computing system 100 might receive a combinatorial optimization problem. In some implementation the problem may have multiple optimal solutions.

At 203, hybrid computing system 100 causes the problem to be embedded into the regular structure of the native graph of quantum processor 124. An embedding algorithm may be used to generate an embedded problem that can be directly mapped into quantum processor 124. Examples of embedding algorithms can be found in U.S. Pat. No. 7,984,012, U.S., Patent No. 9,875,215 and U.S. Publication No. 20170300817A1.

At 204, quantum processor 124 generates samples from the embedded problems. The samples generated are candidate solutions to the problem received at 202. The samples can be used to increase the accuracy and speed of execution of an exact method for solving the problem received at 202, for example a Branch and Bound algorithm.

At 205, hybrid computing system 100 executes one or more computations using the samples generated at 204. The computations may be used for, at least partially increasing the speed of computation of an exact method for solving the problem received at 202. For example, where the exact method is a B&B algorithm, computations may involve improving the initial bound, calculating magnetizations of qubits from the samples generated at 204 and correlations of each pair of variables with non-zero coupling in the samples generated at 204.

Additionally, the samples generated at 204 may be statistically analyzed to choose which option a B&B algorithm should choose first when analyzing a search space.

At 206, hybrid computing system 100 executes an exact method to obtain an optimal solution to the problem received at 202, using the computations from act 205. In some implementations, multiple optimal solutions can be returned, if the problem received at 202 has multiple optimal solutions. In some implementations, a B&B algorithm is executed, using the initial bound, magnetization and correlations computed at 205.

At 207, method 200 terminates, until it is, for example, invoked again.

Figure 3:
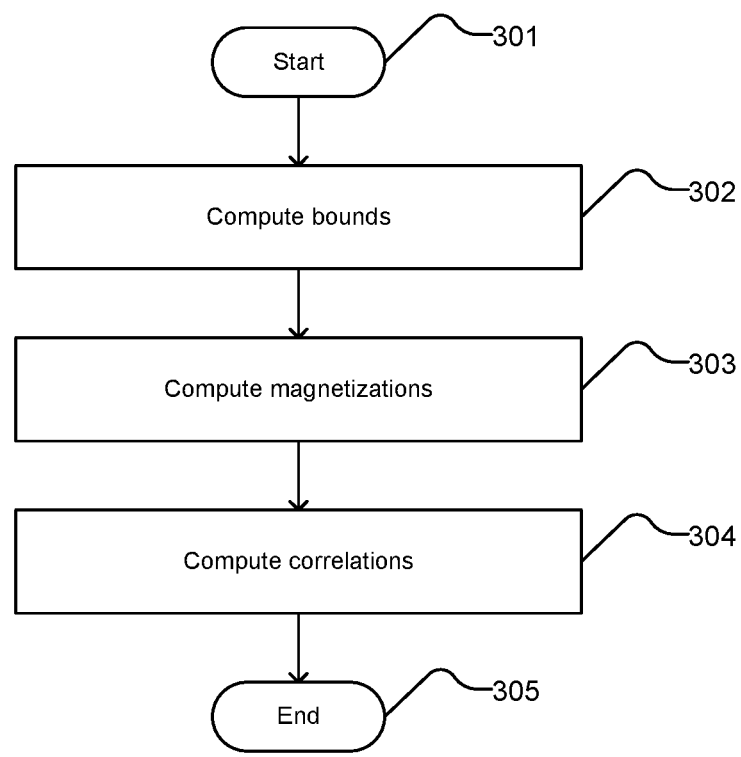
FIG. 3 is a flow chart of an example method of computation based on samples from a quantum processor.
Figure 4:
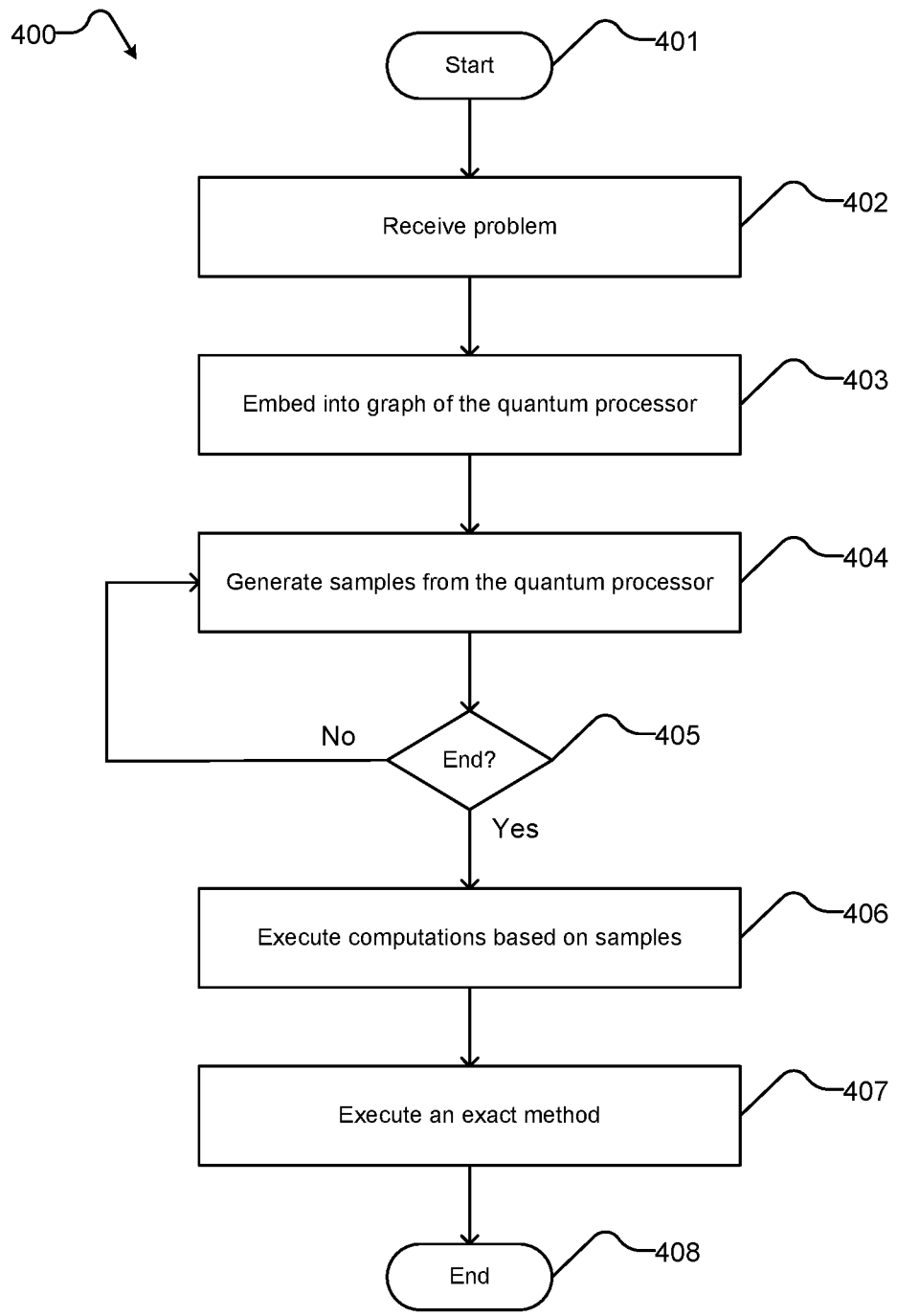
FIG. 4 is a flow chart of an example iterative method for hybrid computation to obtain an exact solution.

FIG. 3 is a flow chart of an example method 300 of computation based on samples from a quantum processor. Method 300 can be used at act 205 of method 200 when the exact method is a Branch and Bound algorithm. Method 300 comprises acts 301 to 305; however, a person skilled in the art will understand that the number of acts is an example, and, in some implementations, certain acts may be omitted, further acts may be added, and/or the order of the acts may be changed. Method 300 may be executed on a hybrid computing system and will be described with reference to hybrid computing system 100 of FIG. 1.

Method 300 starts at 301, for example in response to a call from another routine.

At 302, classical computer 102 computes a bounding function using the samples from the quantum processor generated at 204. The lowest energy of the samples, which corresponds to the ground state, is used to calculate upper bounds. Lower bounds can be calculated for some or all cells of qubits in the topology of quantum processor 124, where a cell of qubits can be defined as a repeated sub-topology of the topology of the quantum processor comprising qubits and couplers.

Lower bounds can be calculated for each row of qubit in the topology of quantum processor 124, for example using low tree width algorithms. Overall lower bounds can be calculated for each set of qubits, $\{q_0, q_1, \ldots, q_{n-1}\}$, $\{q_1, q_2, \ldots, q_{n-1}\}, \ldots, \{q_{n-2}, q_{n-1}\}, \{q_{n-1}\}$. Lower bounds can be stored in an array qubit_bounds such that qubit_bounds[i] is the best guess bound for all qubits $q_{(j>i)}$.

At 303, classical computer 102 computes the magnetizations of qubits from the samples generated by quantum processor 124 at act 205 of method 200.

At 304, classical computer 102 computes the correlations of each pair of variables with non-zero coupling strength from samples generated by quantum processor 124 at act 205 of method 200.

At 305, method 300 terminates, until it is for example, invoked again.

FIG. 4 is a flow chart of an example iterative hybrid quantum-classical exact method 400 for hybrid computation to obtain an exact solution. Method 400 comprises acts 401 to 408; however, a person skilled in the art will understand that the number of acts is an example, and, in some implementations, certain acts may be omitted, further acts may be added, and/or the order of the acts may be changed. Method 400 may be executed on a hybrid computing system and will be described with reference to hybrid computing system 100 of FIG. 1.

Method 400 starts at 401, for example in response to a call from another routine.

At 402, hybrid computing system 100 receives a problem for which an optimal solution is required, as describe above with reference to act 202 of method 200.

At 403, hybrid computing system 100 causes the problem to be embedded into the regular structure of the native graph of quantum processor 124, as described above with reference to act 203 of method 200.

At 404, quantum processor 124 generates samples from the embedded problems, as described above with reference to act 204 of method 200.

At 405, hybrid computing system 100 checks whether an exit condition has been met. The exit condition can be the execution of a predetermined number of iterations, or the satisfaction of a measure of quality of the samples generated at 404. If the exit condition has been met, control passes to 406, otherwise to 404, where quantum processor 124 generates more samples.

At 406, hybrid computing system 100 executes a number of computations using the samples generated at 404, as described above with reference to act 205 of method 200.

At 407, hybrid computing system 100 executes an exact method on to obtain an optimal solution to the problem received at 402, using the computations from act 406, as described above with reference to act 206 of method 200.

At 408, method 400 terminates, until it is, for example invoked again.

While method 400 shows an example of an exact method executing after hybrid computing system 100 obtains samples from quantum processor 124, other processes are also possible. For example, in at least one implementation, the exact method and the sampling from the quantum processor may happen concurrently or simultaneously or partially overlapping in time, and the samples and computations using the samples may be used to update the exact method dynamically.

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for example purposes only and may change in alternative examples. Some of the example acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other methods of quantum computation, not necessarily the example methods for quantum computation generally described above.

The various implementations described above can be combined to provide further implementations. All of the commonly assigned US patent application publications, US patent applications, foreign patents, and foreign patent applications referred to in this specification and/or listed in the Application Data Sheet are incorporated herein by reference, in their entirety, including but not limited to: U.S. Patent Application No. 62/802,809; U.S. Pat. Nos. 7,533,068; 8,008,942; 8,195,596; 8,190,548; 8,421,053; International Patent Publication No WO2017214331A1; U.S. Pat. Nos. 9,875,215; 7,984,012; 9,875,215; and U.S. Publication No. US20170300817A1.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a computational system to solve a problem having at least one optimal solution, the computational system comprising a quantum processor and at least one non-quantum processor, the method performed by the at least one non-quantum processor and comprising:

embedding the problem into a regular structure on the quantum processor as an embedded problem;

instructing, by the at least one non-quantum processor, performance of quantum annealing by the quantum processor to generate a plurality of samples, wherein each sample of the plurality of samples is representative of a potential solution to the embedded problem;

determining, by the at least one non-quantum processor, one or more solver parameters of a Branch-and-Bound algorithm based at least on the plurality of samples generated by the quantum processor, wherein the determining the one or more solver parameters includes computation of one or more of: an initial bound of the Branch-and-Bound algorithm, magnetizations of the plurality of samples, and correlations of the plurality of samples; and executing, by the at least one non-quantum processor, the Branch-and-Bound algorithm having the determined one or more solver parameters to generate the at least one optimal solution to the problem.

2. The method of claim 1 wherein embedding, by the at least one non-quantum processor, the problem into a regular structure to produce an embedded problem includes embedding the problem into a topology of the quantum processor to produce the embedded problem.

3. The method of claim 1 wherein the determining by the at least one non-quantum processor, one or more solver parameters of a Branch-and-Bound algorithm based at least on the plurality of samples generated by the quantum processor, comprises statistically analyzing the plurality of samples.

4. The method of claim 1 further comprising iteratively performing the instructing, by the at least one non-quantum processor, performance of quantum annealing by the quantum processor to generate the plurality of samples, wherein each sample of the plurality of samples is representative of a potential solution to the embedded problem, before the determining by the at least one non-quantum processor, the one or more solver parameters of the Branch-and-Bound algorithm based at least one the plurality of samples generated by the quantum processor.

5. The method of claim 1 wherein the executing, by the at least one non-quantum processor, the Branch-and-Bound algorithm having the determined one or more solver parameters to generate the at least one optimal solution to the problem, includes executing, by the at least one non-quantum processor, the Branch-and-Bound algorithm having the determined one or more solver parameters to generate multiple optimal solutions.

6. The method of claim 1 wherein the instructing, by the at least one non-quantum processor, performance of quantum annealing by the quantum processor and the executing, by the at least one non-quantum processor, the Branch-and-Bound algorithm having the determined one or more solver parameters are concurrent operations, overlapping at least a portion thereof.

7. The method of claim 6 further comprising updating, by the at least one non-quantum processor, the one or more solver parameters of the Branch-and-Bound algorithm as the plurality of samples are generated from the quantum processor.

8. A computational system comprising a quantum processor and at least one non-quantum processor, the at least one non-quantum processor operable to:

embed a problem having at least one optimal solution into a regular structure on the quantum processor as an embedded problem;

instruct performance of quantum annealing by the quantum processor to generate a plurality of samples, wherein each sample of the plurality of samples is representative of a potential solution to the embedded;

determine one or more solver parameters of a Branch-and-Bound algorithm based at least on the plurality of samples generated by the quantum processor, wherein the one or more solver parameters are one or more of: an initial bound of the Branch-and-Bound algorithm, magnetizations of the plurality of samples, and correlations of the plurality of sample; and execute the Branch-and-Bound algorithm having the determined one or more solver parameters to generate the at least one optimal solution to the problem.

9. The computational system of claim 8 wherein the at least one non-quantum processor is operable to embed the problem into a topology of the quantum processor to produce the embedded problem.

10. The computational system of claim 8 wherein the at least one non-quantum processor is operable to statistically analyzes the plurality of samples.

11. The computational system of claim 8, wherein the at least one non-quantum processor is further operable to iteratively instruct performance of quantum annealing by the quantum processor to generate a plurality of samples as potential solutions to the problem.

12. The computational system of claim 8 wherein the at least one non-quantum processor is operable to execute the Branch-and-Bound algorithm having the determined one or more solver parameters to generate multiple optimal solutions.

13. The system of claim 8 wherein the at least one non-quantum processor is operable to instruct performance of quantum annealing by the quantum processor to generate a plurality of samples concurrently with execution of the Branch-and-Bound algorithm having the determined one or more solver parameters, overlapping at least a portion thereof.

14. The system of claim 13 wherein the at least one non-quantum processor is operable to update the one or more solver parameters of the Branch-and-Bound algorithm as the plurality of samples are generated from the quantum processor.

* * * * *